United States Patent
Kempshall et al.

(10) Patent No.: US 10,448,771 B1
(45) Date of Patent: Oct. 22, 2019

(54) BAG CLAMP

(71) Applicants: Scott R. Kempshall, St. Petersburg, FL (US); Tina L. Dyer, St. Petersburg, FL (US)

(72) Inventors: Scott R. Kempshall, St. Petersburg, FL (US); Tina L. Dyer, St. Petersburg, FL (US)

(73) Assignee: QOI Products LLC, St. Petersburg, FL (US)

( * ) Notice: Subject to any disclaimer, the term of this patent is extended or adjusted under 35 U.S.C. 154(b) by 230 days.

(21) Appl. No.: 15/412,235

(22) Filed: Jan. 23, 2017

Related U.S. Application Data

(63) Continuation-in-part of application No. 15/356,077, filed on Nov. 18, 2016, which is a continuation-in-part of application No. 14/455,016, filed on Aug. 8, 2014, now Pat. No. 9,526,366.

(51) Int. Cl.
*A47G 29/08* (2006.01)
*F16B 2/10* (2006.01)
*F16B 2/18* (2006.01)

(52) U.S. Cl.
CPC .............. *A47G 29/083* (2013.01); *F16B 2/10* (2013.01); *F16B 2/18* (2013.01)

(58) Field of Classification Search
CPC ........... A47G 29/083; F16B 2/10; F16B 2/18; F16M 13/022; Y10T 24/3969
See application file for complete search history.

(56) References Cited

U.S. PATENT DOCUMENTS

| | | | |
|---|---|---|---|
| 1,416,656 A * | 5/1922 | Lyman | B60J 1/04 16/330 |
| 2,920,369 A | 1/1960 | Zezula | |
| 3,196,544 A * | 7/1965 | Baker | B43L 13/06 33/439 |
| 5,400,902 A * | 3/1995 | Kaminski | G11B 23/00 206/310 |
| 6,324,285 B1 * | 11/2001 | Dowsett | B60R 11/0241 242/400 |
| 7,468,665 B2 * | 12/2008 | Grundy | A45C 13/24 340/568.1 |
| 7,847,692 B2 * | 12/2010 | Schuller | G08B 25/10 248/346.03 |
| D642,450 S * | 8/2011 | Freese | D8/367 |
| 8,371,546 B2 | 2/2013 | Bauerly | |
| 8,524,626 B2 | 9/2013 | Freese | |
| 8,534,626 B1 * | 9/2013 | Freese | A47G 29/083 24/376 |
| 9,080,715 B2 | 7/2015 | Biddle et al. | |
| 9,507,371 B1 * | 11/2016 | Day | G05G 1/54 |

(Continued)

*Primary Examiner* — Victor D Batson
*Assistant Examiner* — Matthew J Sullivan
(74) *Attorney, Agent, or Firm* — Nicholas Pfeifer; Smith & Hopen, P. A.

(57) ABSTRACT

A bag clamp having retention arms, capable of rotating about a pivoting axis between an open and closed position. The retention arms are connected to a locking mechanism configured to prevent the retention arms from pivoting to an open configuration when the locking mechanism is in an engaged setting. The arms are shaped to create an open receiving space. The open receiving space allows the bag clamp to receive a rigid structure to clamp onto while also receiving a bag's straps.

14 Claims, 27 Drawing Sheets

(56) References Cited

U.S. PATENT DOCUMENTS

| | | | |
|---|---|---|---|
| 2003/0038220 A1* | 2/2003 | Catan | A47G 29/083 248/304 |
| 2005/0056746 A1* | 3/2005 | Landver | A47G 29/083 248/227.1 |
| 2009/0217497 A1* | 9/2009 | Lans | A47G 29/083 24/499 |
| 2011/0297196 A1* | 12/2011 | Durante | A45B 17/00 135/15.1 |
| 2014/0259532 A1* | 9/2014 | Millard | E05D 11/1028 16/326 |
| 2015/0069206 A1* | 3/2015 | Sakuma | A47G 25/0607 248/552 |

* cited by examiner

BAG CLAMP

CROSS-REFERENCE TO RELATED APPLICATIONS

This nonprovisional application is a continuation-in-part of and claims priority to nonprovisional application Ser. No. 15/356,077, entitled "BAG CLAMP," filed Nov. 18, 2016 by the same inventors, which is a continuation-in-part of and claims priority to nonprovisional application Ser. No. 14/455,016, entitled "BAG CLAMP," filed Aug. 8, 2014 by the same inventors, and patented on Dec. 27, 2016 as U.S. Pat. No. 9,526,366.

BACKGROUND OF THE INVENTION

1. Field of the Invention

This invention relates, generally, to purse or bag hangers. More specifically, it relates to a purse or bag hanger capable of removably securing a bag to a structure, such as a post, or any vertical or horizontal surface.

2. Brief Description of the Prior Art

Carriers of purses, handbags, and any other personal accessory having handles rarely have a suitable location for storing their bags when in public places. Those who carry bags often have to choose whether to place their bags on a tabletop, on a chair back, in their laps, or on the ground. Tabletops typically are limited in surface area, chair backs are out of sight, laps are uncomfortable, and the ground is unsanitary. In all cases, lack of a secure and reliable method for retention renders the aforementioned devices susceptible to damaging impact with surfaces, theft and soiling.

Attempts have been made to overcome these problems; however, they have obvious disadvantages. Most bag hangers, such as U.S. Pat. No. 8,371,546 B2 to Bauerly, use friction to keep the hanger set on the table or surface. These devices can easily slip off the table or surface when the bag or hanger is accidentally contacted. Additionally, these devices provide no security from potential thieves.

Other devices, such as U.S. Pat. No. 2,920,369 A to Zezula, use a suspension clamp to hang a bag from a surface. Such devices are still susceptible to theft because the clamping force is released when the tension, supplied by the weight of the bag, is relieved upon lifting the bag.

Accordingly, what is needed is a bag hanging device capable of being removably secured to a surface without the possibility of becoming accidentally detached from the surface or purposefully stolen. It is also recognized that there is a need for a device that allows secure attachment to surfaces of orientations other than horizontal such as vertical walls or chair backs. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved bag-hanging device is now met by a new, useful, and nonobvious invention.

The novel structure includes a first retention arm and a second retention arm, where each retention arm has a first end and a second end creating a length. The first ends are connected to a mechanism housing and the second ends are connected to contacting surfaces. The retention arms have a shape such that there are only two possible points of contact creating an open receiving space. One point of contact is at the mechanism housing and the other point of contact is the contacting surfaces.

The retention arms are capable of rotating with respect to each other about a pivoting axis. The pivoting axis runs through the mechanism housing in close proximity to the first end of the retention arms. The retention arms have an open position and a closed position, where in the closed position the contacting surfaces of the first retention arm and the second retention arm are in close proximity and in the open position the contacting surface of the first retention arm and the second retention arm are at a distance apart that is greater than the distance between the contacting surfaces in the closed position.

The mechanism housing contains a locking mechanism having an engaged setting and a disengaged setting. In the engaged setting, the locking mechanism prevents the retention arms from rotating toward the open position and in the disengaged setting, the locking mechanism allows the retention arms to rotate toward the open position. The first and second retention arms form an outer perimeter when in the closed position and the mechanism housing is located within the outer perimeter.

The present invention also includes a release button having a first position and a second position and in communication with the locking mechanism. When in the first position, the release button places the locking mechanism in the engaged setting and when in the second position, the release button places the locking mechanism in the disengaged setting. A biasing component is in communication with the release button such that transitioning from the first position to the second position requires overcoming a biasing force imposed on the release button by the biasing component.

In a certain embodiment, the locking mechanism is a ratchet mechanism having a first ratchet component and a second ratchet component such that the two ratchet components are contacting each other when in the locking mechanism is in the engaged setting. The first ratchet component is in communication with the first retention arm such that rotation of the first retention arm results in rotation of the first ratchet component and the second ratchet component is in communication with the second retention arm such that rotation of the second retention arm results in rotation of the second ratchet component. The second ratchet component is also in communication with the biasing component and the release button, so that biasing force forces the second ratchet component toward the first ratchet component, which in turn forces the release button to the first position. The biasing force is of a predetermined magnitude such that an external force applied to the release button may overcome the biasing force to urge the release button to the second position and transfer the external force to the second ratchet component resulting in the first and second ratchet components separating to place the locking mechanism is in the disengaged setting.

In another embodiment, the locking mechanism is a assembly having a jamming component, a jamming release, and a jamming component mount. The jamming release includes wedges in communication with jamming component wedge receipts and release wedge receipts and the jamming release is in communication with the release button. The jamming component is rotationally mounted on the mount, such that the jamming component is capable of rotating with respect to the mount. The jamming component is also in communication with second retention arm, such that the jamming component is subjected to a moment of force attempting to rotate the jamming component with respect to the second retention arm.

Additionally, this embodiment includes the first retention arm having a cylindrical extension with an inner diameter and a length such that at least some portion of the jamming component is encircled by the inner diameter of the cylindrical extension. The cylindrical extension has a central longitudinal axis and the jamming component has a rotational axis where the two axes are not longitudinally aligned. This orientation allows for the jamming component to frictionally secure the cylindrical extension when rotated. The disengaged setting includes the jamming release and wedges forced toward the mount, by the release button overcoming the biasing force of the biasing component to transition the release button to the second position. This movement overcomes the moment of force and aligns the wedge receipts with the release wedge receipts. The alignment of wedge receipts and the release wedge receipts results in the jamming component oriented within the cylindrical extension such that the jamming component is not in a frictionally securing contact with the cylindrical extension. The engaged setting includes the jamming release, wedges, and release button forced away from the mount, by the biasing force of the biasing component, leaving only a portion of the wedges in communication with the wedge receipts and the release wedge receipts. The moment of force causes the jamming component to rotate so that the wedge receipts and the release wedge receipts are no longer aligned and so that the jamming component is in frictionally securing contact with the cylindrical extension.

In a certain embodiment, the present invention includes a wireless communication module capable of communicating with a mobile device. In a certain embodiment, the bag clamp has a visual alert and/or an audible alert. Both alerts may be synced with a mobile device through the wireless communication module.

In a certain embodiment, one or both of the connections between the contacting surfaces and the retention arms are pivoting connections.

A certain embodiment includes an alternate orientation attachment having an open receiving space that is generally perpendicular to the open receiving space of the bag clamp.

A certain embodiment has a strap retention feature originating near one end of one of the retention arms within the outer perimeter of the arms creating a gap, of a predetermined distance between the one retention arm and the strap retention feature that is adapted to receive a bag's straps.

A certain embodiment includes a secondary locking mechanism having an engaged setting at a predetermined amount of rotation about the pivoting axis, which prevents the arms from rotating an amount greater than the predetermined amount of rotation.

In a certain embodiment, the present invention includes a mechanical lock having a locked position and an unlocked position, where the locked position prevents the locking mechanism from moving to the disengaged setting.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
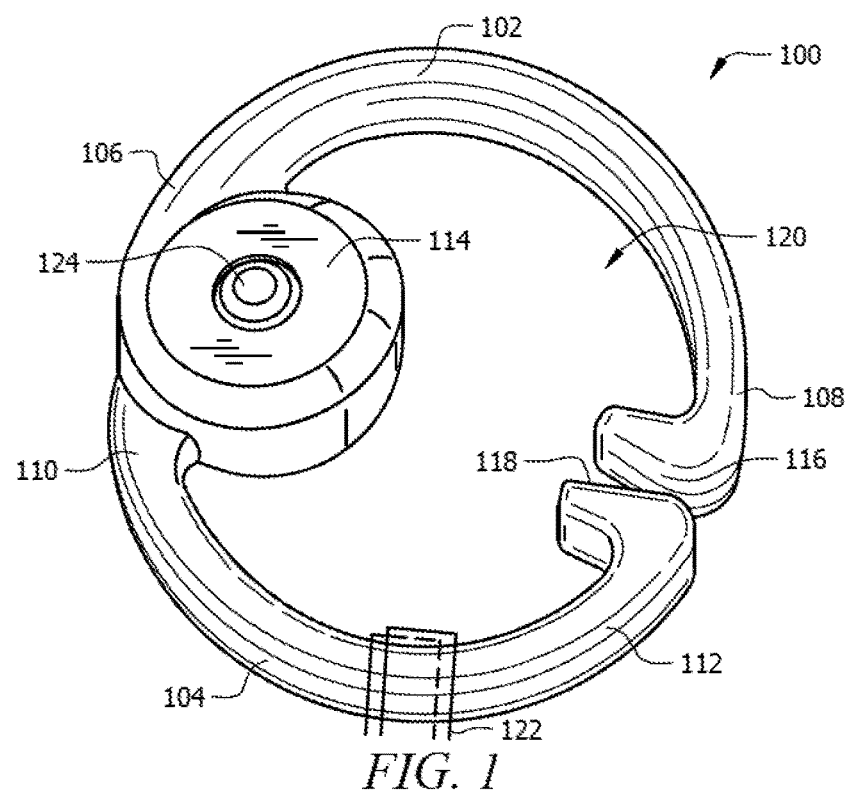
FIG. 1 is a front perspective view of a certain embodiment of the present invention in a closed position.
Figure 2:
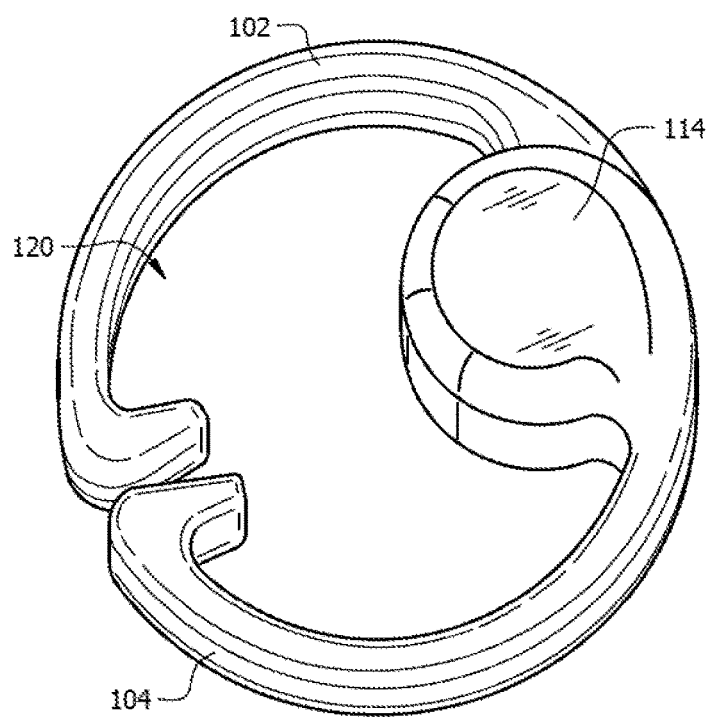
FIG. 2 is a rear perspective view of the embodiment presented in FIG. 1.
Figure 3:
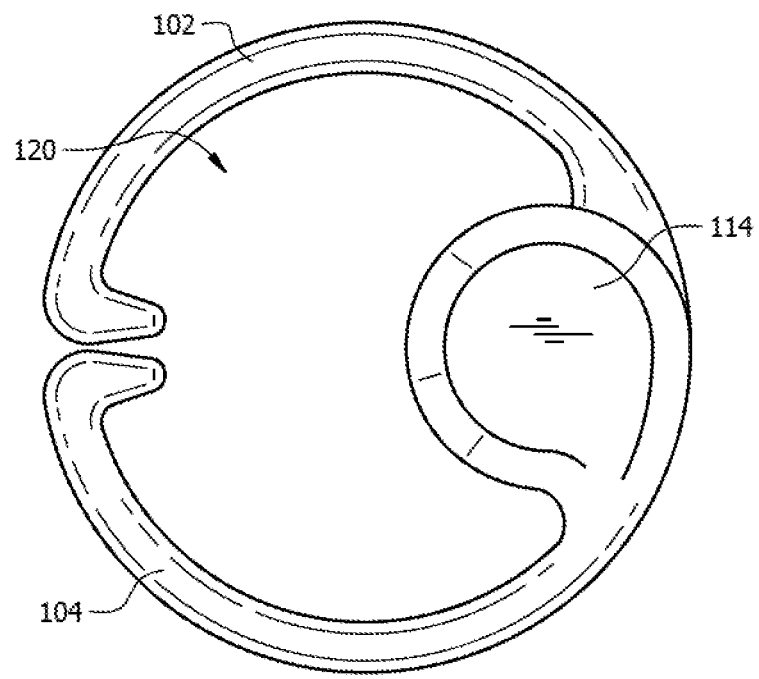
FIG. 3 is a rear view of the embodiment shown in FIG. 1.
Figure 4:
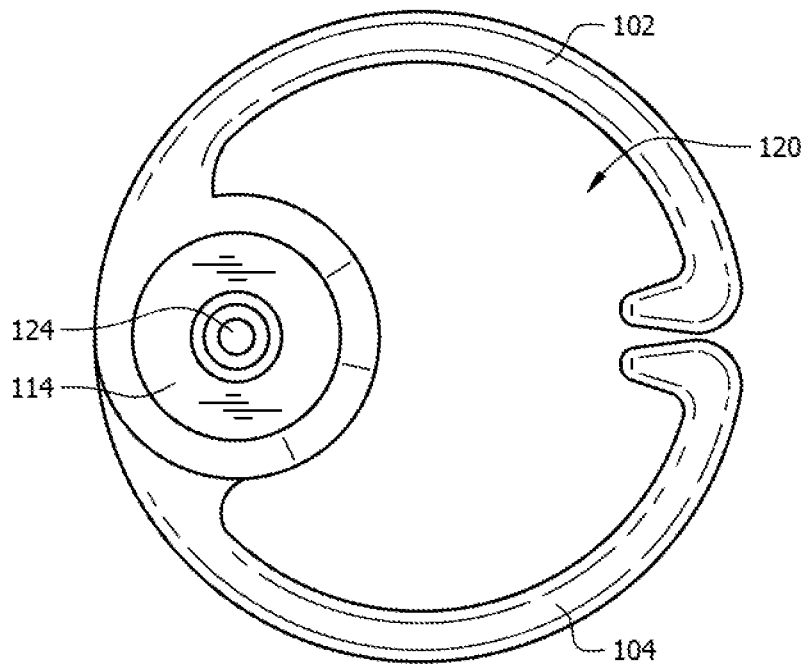
FIG. 4 is a front view of the embodiment shown in FIG. 1.
Figure 5:
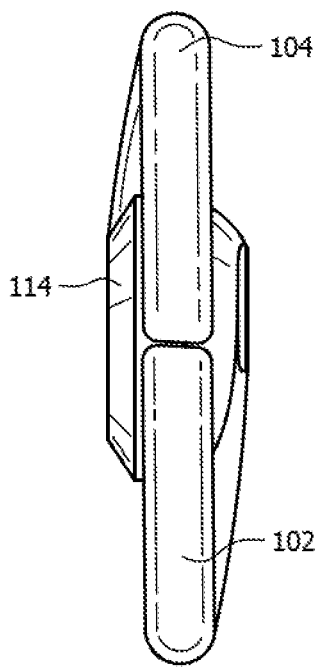
FIG. 5 is a side view of the embodiment shown in FIG. 1.
Figure 6:
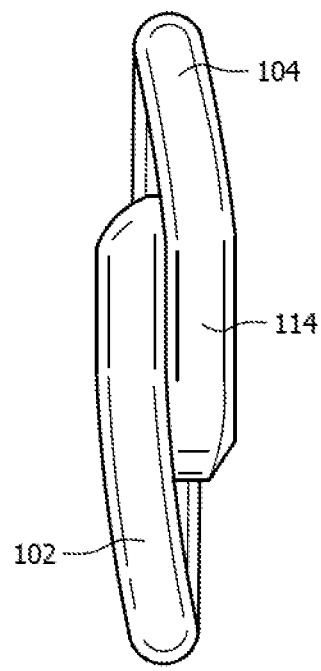
FIG. 6 is an alternative side view with respect to FIG. 5.
Figure 7:
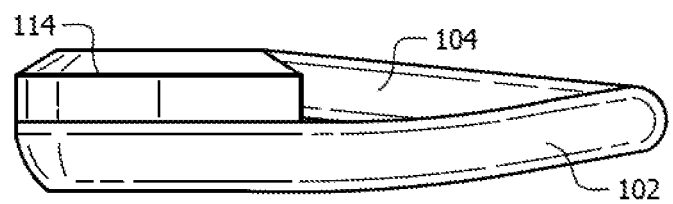
FIG. 7 is a bottom view of the embodiment shown in FIG. 1.
Figure 8:
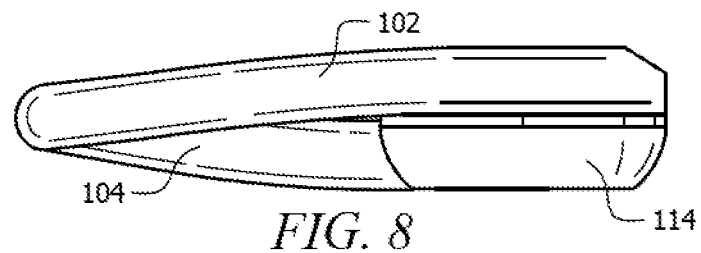
FIG. 8 is a top view of the embodiment shown in FIG. 1.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Glossary of Claim Terms

Biasing Component: is an object applying a force to a structural component.

Frictionally Securing Contact: is a contact between two surfaces that prevents movement of the two surfaces with respect to each other based on friction force.

Moment of Force: is a tendency to cause rotation about a specific axis.

Open Receiving Space: is the open space between the retention arms.

Ratcheting Mechanism: is a device having a bar or wheel with a set of teeth in which a pawl, cog, or tooth engages to allow motion in only one direction.

Release Button: is any mechanism having a first biased position and a second urged position.

Visual Alert: is an observable and identifiable change to the bag clamp.

The present invention is a bag clamp having at least two coaxial retention arms, capable of rotating about a pivoting axis between an open and closed position. Each retention arm is connected to a mechanism housing that has an ability to lock and release the retention arms at various degrees of rotation about the pivoting axis. Each retention arm has a first end and a second end creating a length between the two ends. The first end is connected to the mechanism housing and the second end is connected to a contacting surface. In a certain embodiment, the contacting surface has a cross-section greater than the cross-section of the retention arm creating a hook like feature extending toward the first end of the retention arm. In a certain embodiment, the contacting surfaces are made of a material having a high coefficient of friction and/or have surface features that increase the coefficient of friction. The coefficient of friction of the contacting surface is predetermined to overcome the forces acting on the bag clamp that are attributed to a bag, of a predetermined weight, hanging from the clamp. In a certain embodiment, the present invention includes end caps on the contacting surfaces, which improve the coefficient of friction, protect the surface to which the clamp is secured, and elastically deform to allow for greater clamping force. The end caps can be fixed or removably attached to the contacting surfaces/retention arms as is known to a person having ordinary skill in the art. The end caps are made of any material, known to a person having ordinary skill in the art, capable of elastically deforming, preferably elastically deforming before the retention arms.

The length of the retention arms extends outwards in a generally radial direction with respect to the pivoting axis. When in the fully closed position, the retention arms have two possible points of contact—the mechanism housing and contacting surfaces, such that the bag clamp has an outer perimeter and an open receiving space formed by the two retention arms. The mechanism housing is preferably located inside of the outer perimeter, toward the open receiving space. Additionally, the mechanism housing includes a locking mechanism to allow the retention arms to lock at generally any degree of pivot with respect to the pivoting axis. The retention arms are released from a locked position by a release button. The release button has a first biased position and a second urged position. The second urged position is achieved by overcoming the biasing force on the release button. The locking mechanism transitions between the disengaged setting and engaged setting as the release button transitions between the first biased position and the second urged position.

The disengaged setting of the locking mechanism allows the retention arms to rotate with respect to each other. The engaged setting prevents the retention arms from moving to a more open position. In a certain embodiment, the engaged setting allows the retention arms to rotate from an open position to a more closed position. The locking mechanism may be any device known to a person having ordinary skill in the art, such that the device has a setting preventing the retention arms from rotating toward the open position, such as a pawl and ratchet wheel. In a certain embodiment, the clamp may be subjected to a rotational bias in conjunction with the locking mechanism or may be subjected to a rotational bias without a locking mechanism, such that the rotational bias is forcing the clamp toward the closed position.

Examples of the Present Invention

As shown in FIG. 1, a certain embodiment of the present invention, generally denoted by reference numeral 100, includes two coaxial retention arms—first retention arm 102 and second retention arm 104. First retention arm 102 has first end 106 and second end 108. Similarly, second retention arm 104 has first end 110 and second end 112. First ends 106 and 110 of the two retention arms are connected to mechanism housing 114. Second ends 108 and 112 are connected to contacting surfaces 116 and 118, respectively. The contacting surfaces 116 and 118 have a surface area larger than the cross-section of retention arms 102 and 104. Additionally, contacting surfaces 116 and 118 extend toward first ends 106 and 110, respectively, creating a hook like feature.

Figure 10:
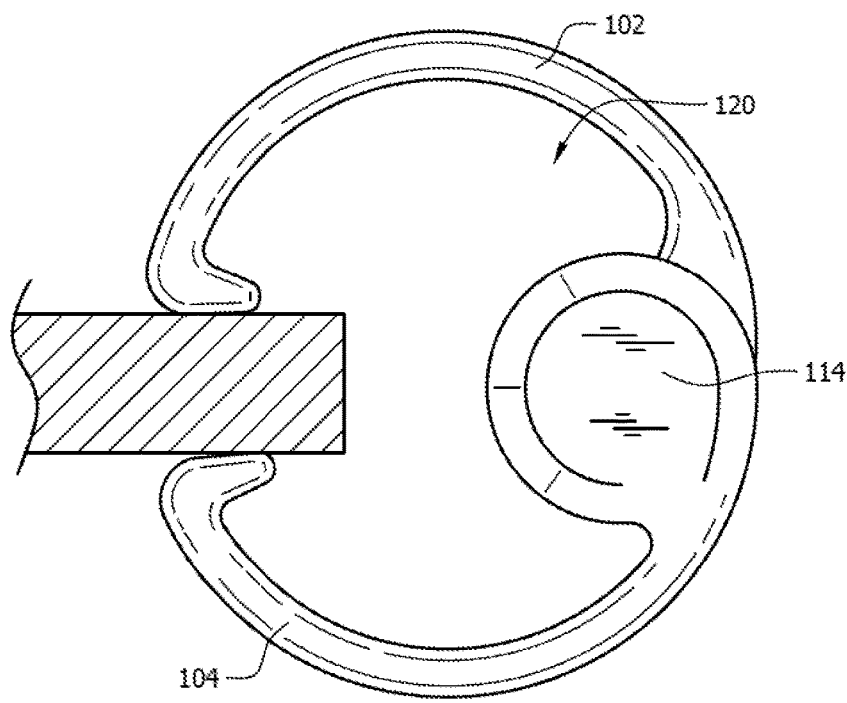
FIG. 10 is a rear view of the embodiment shown in FIG. 1 mounted to a horizontal surface.
Figure 11:
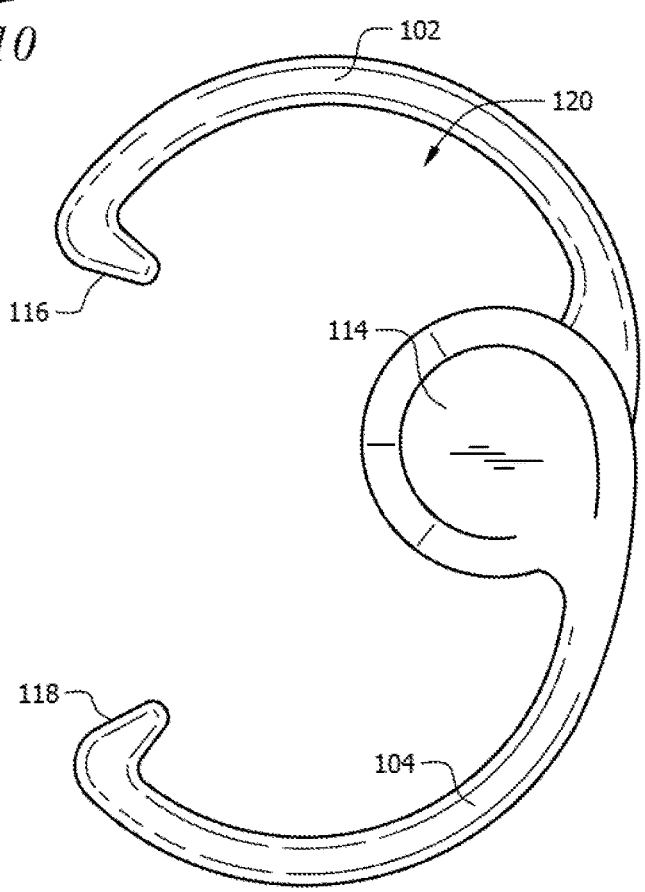
FIG. 11 is a rear view of the present invention in an open position greater than that of the embodiment shown in FIGS. 9 and 10.

Retention arms 102 and 104 each have a shape such that the two retention arms have only two possible points of contact creating open receiving space 120. The two possible points of contact include mechanism housing 114 and contacting surfaces 116 and 118. Open receiving space 120 receives bag straps 122 (two straps are shown) along with a surface or structure that the clamp is intended to be secured (See FIG. 10).

Figure 9:
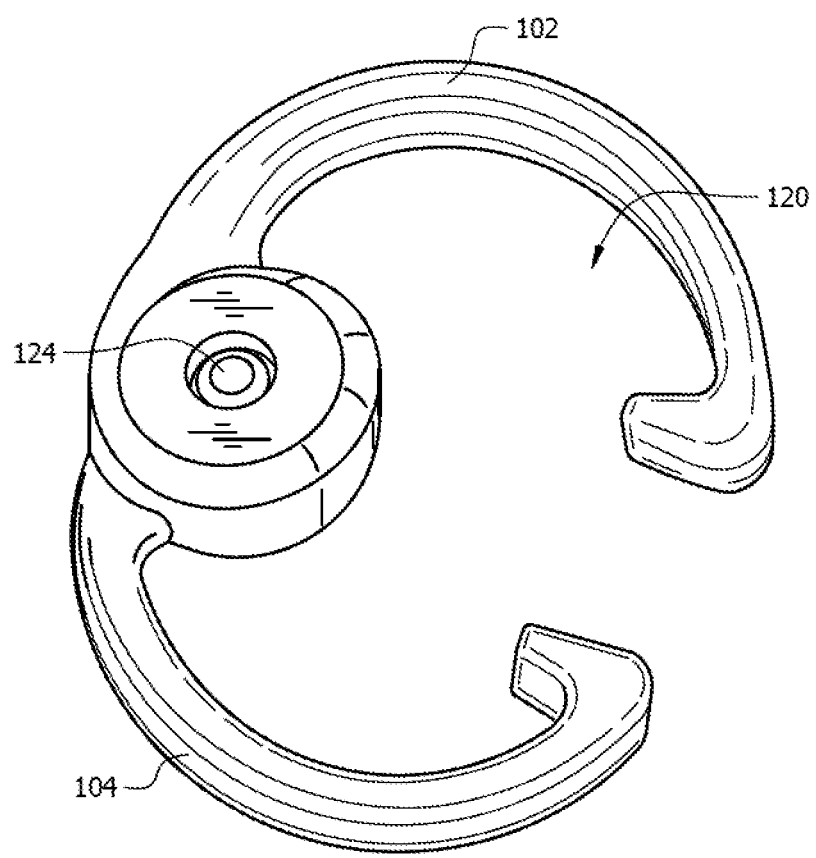
FIG. 9 is a front perspective view showing the present invention in an open position.

Mechanism housing 114 includes release button 124 centrally located about the pivoting axis of mechanism housing 114. However, release button 124 may be located anywhere on the bag clamp as is known to a person having ordinary skill in the art. Release button 124 is shown in a first biased position. Release button 124 is under a biasing force and has a second urged position achievable when an external force, usually created by a user, overcomes the biasing force. The second urged position (See FIG. 9) is achieved when release button 124 is compressed into mechanism housing 114.

The mechanism housing includes a locking mechanism, which has an engaged setting and a disengaged setting. The engaged setting prevents retention arms 102 and 104 from rotating toward the open position and the disengaged setting allows retention arms 102 and 104 to rotate toward the open position. As shown in the exploded views of FIGS. 12-14, the mechanism housing is made up of two halves—first half 113 and second half 115. First retention arm 102 is connected to first half 113 and second retention arm 104 is connected to second half 115. First half 113 has semi-circular coupling feature 117 that extends toward second half 115 and has groove 119. Second half 115 has circular coupling feature 121 that extends toward first half 113, has groove 123, and has a radius greater than coupling feature 117. The two halves 113 and 115 are joined by aligning grooves 119 and 123 and inserting C-shaped clamping feature 125 into grooves 119 and 123. Clamping feature 125 has a thickness such that there is an inner surface and an outer surface, where the inner surface has a radius generally the same as the radius of groove 119 and the outer surface has a radius generally the same as groove 123. Clamping feature 125 is therefore able to maintain the alignment of grooves 119 and 123 while also allowing the two halves 113 and 115 to rotate with respect to each other. Additionally, clamping feature 125 has a C-shape with a circumference greater than a half circle to enable clamping feature to hold the two halves 113 and 115 together. Furthermore, clamping feature 125 is made of a material having a predetermined Young's modulus such that it can plastically deform around the mechanism housing and return to its original shape when set into grooves 119 and 123.

Figure 12A:
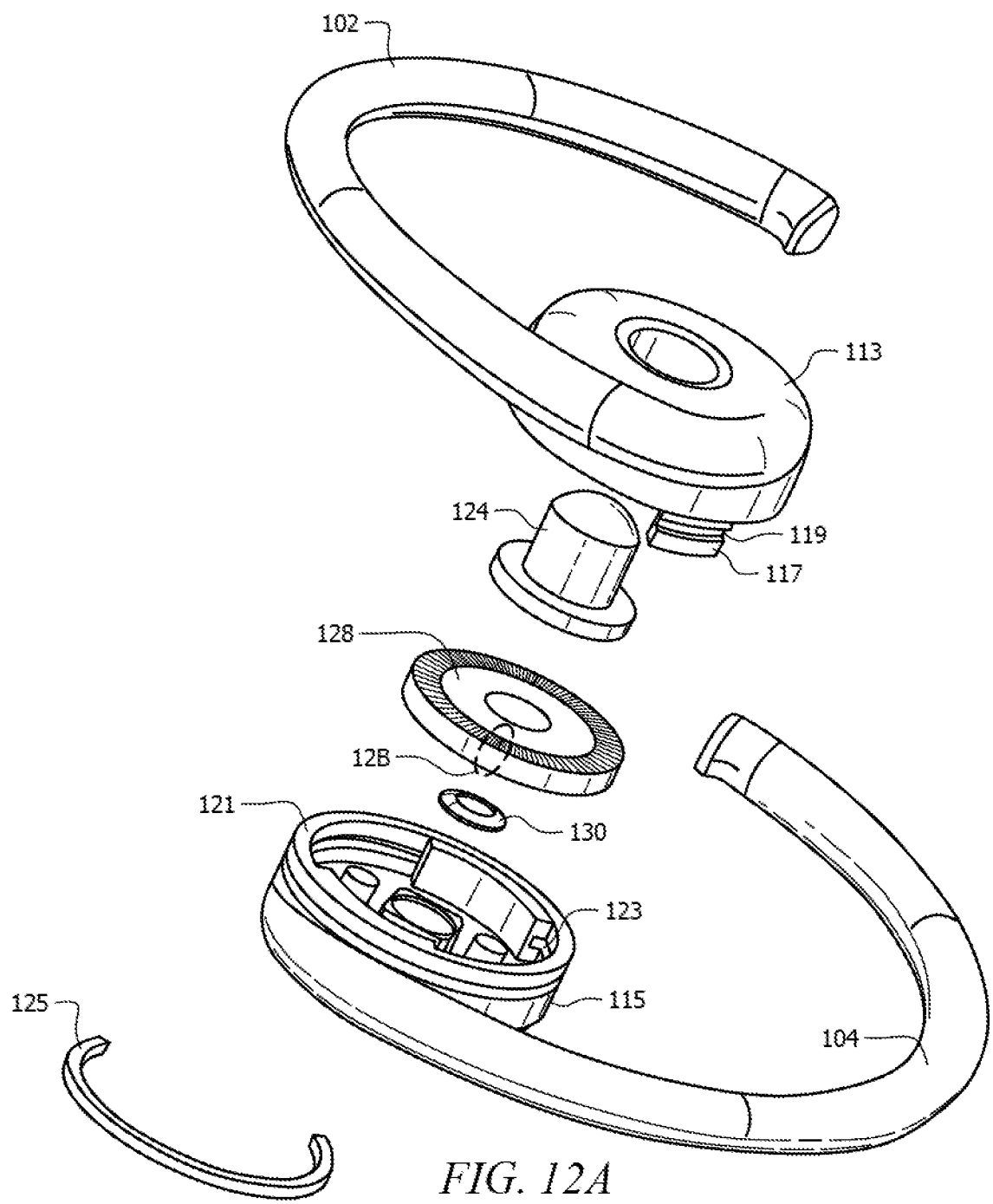
FIG. 12a is an exploded view of a certain embodiment of the present invention.
Figure 12B:
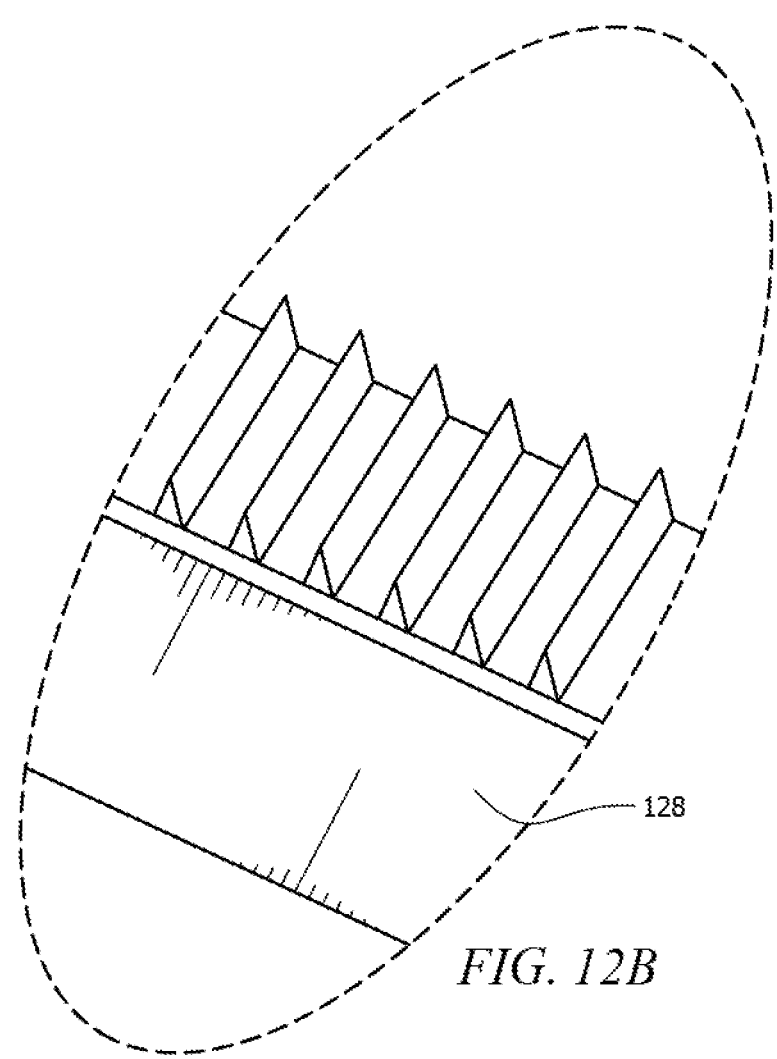
FIG. 12b is a close-up view of the second ratchet component.
Figure 12C:
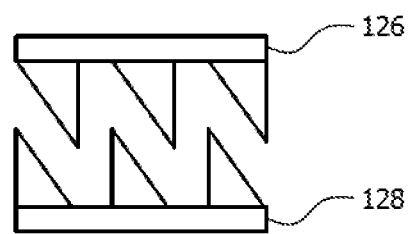
FIG. 12c is a close-up view of how the first ratchet component is oriented with respect to the second ratchet component in a certain embodiment of the present invention.
Figure 13:
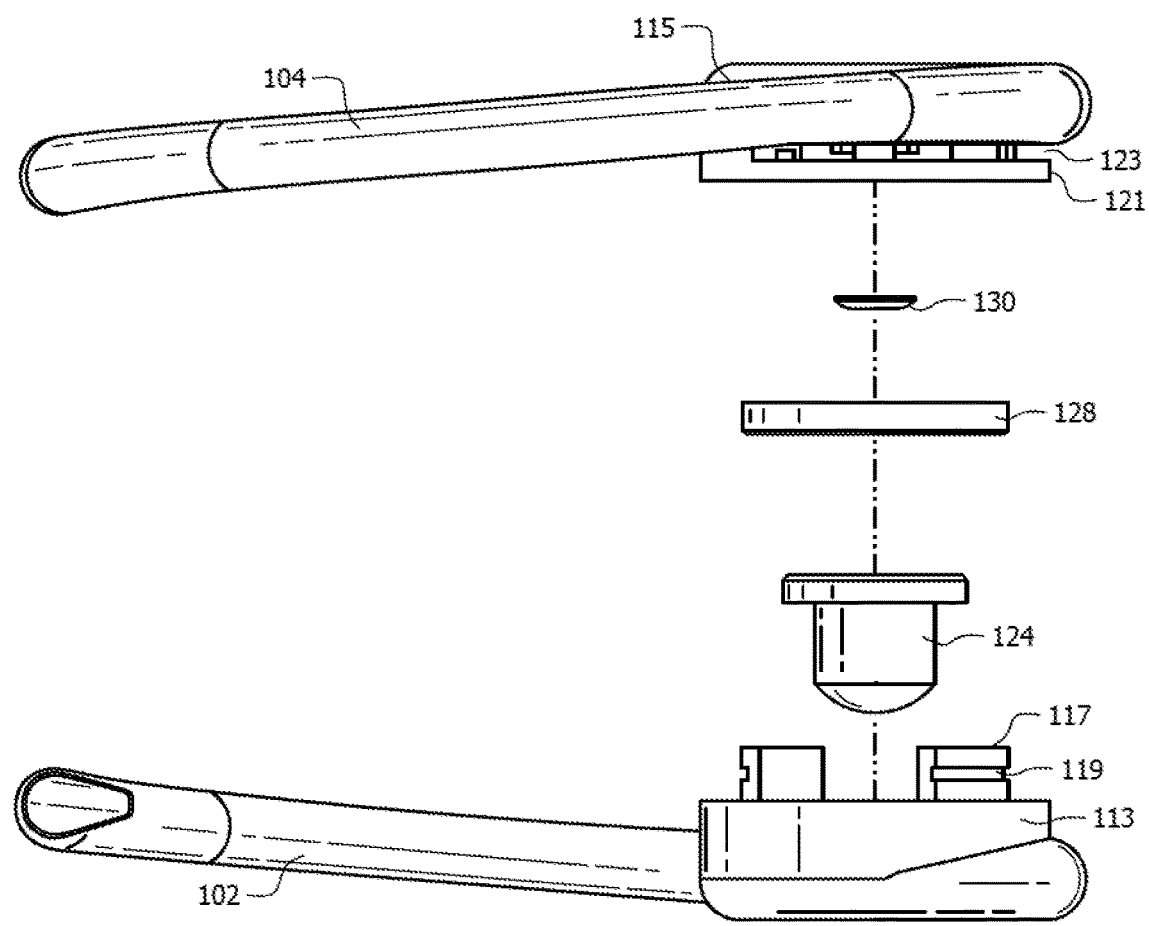
FIG. 13 is an exploded view oriented from the bottom of the present invention.
Figure 14:
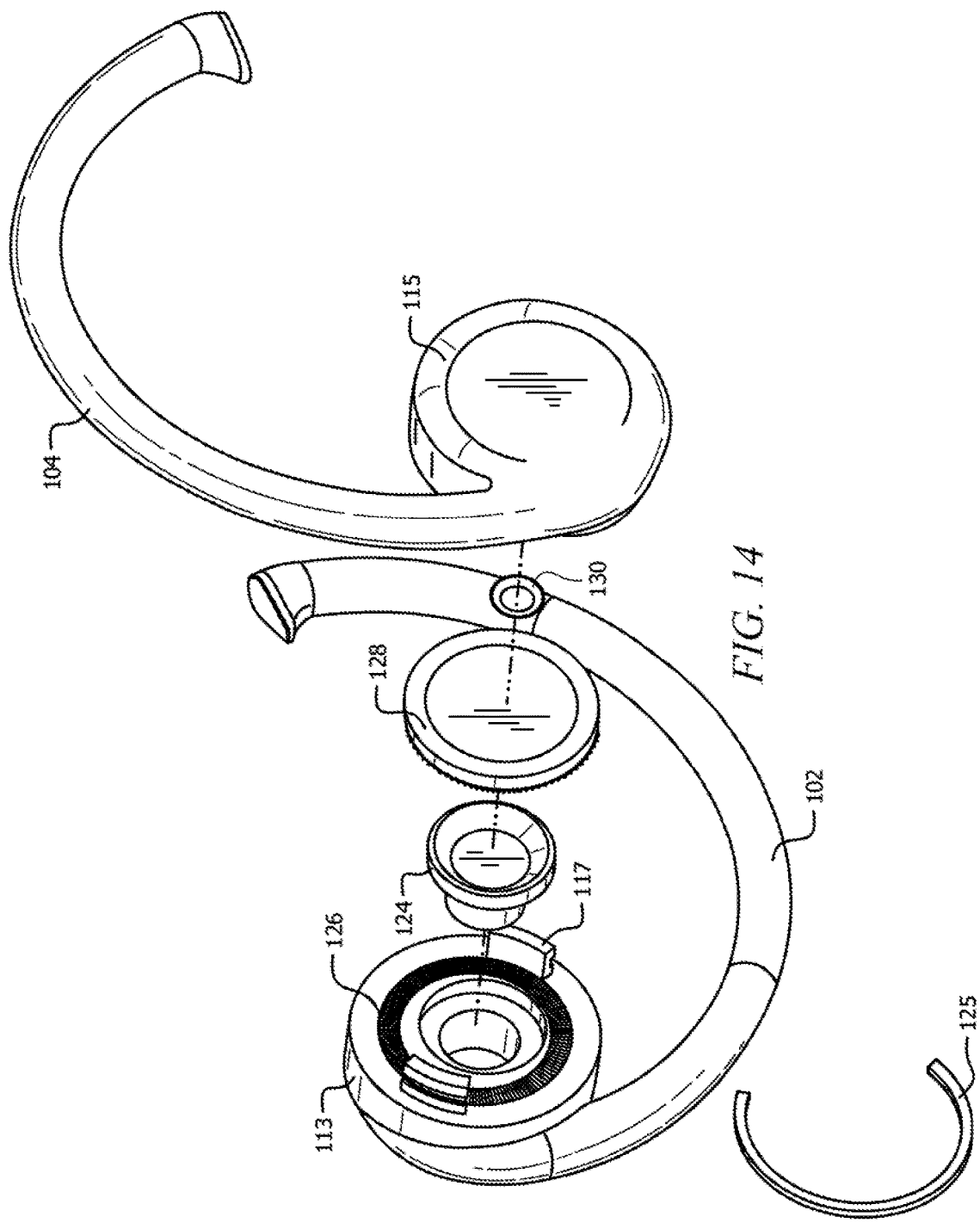
FIG. 14 is an exploded view from a rear perspective.

FIGS. 12-14 also provide a certain embodiment of the locking mechanism referred to as a ratcheting mechanism. The ratcheting mechanism includes first ratchet component 126 connected to first half 113, which is in turn connected to first retention arm 102. Additionally, the ratcheting mechanism includes second ratchet component 128 coupled to second half 115, which is connected to second retention arm 104. Second ratchet component 128 is constrained from rotation about the radial axis but is allowed to articulate along the radial axis of component 115 when the button component 124 is actuated. In a certain embodiment, the ratchet components can be fixedly or temporarily attached to the mechanism housing through any method known to a person having ordinary skill in the art, so long as the ratcheting components rotate along with the respective halves of the mechanism housing upon which they are attached.

Moreover, the locking mechanism includes biasing component 130, which forces second ratchet component 128 toward first ratchet component 126 such that the teeth of the two ratchet components 126 and 128 are capable of contacting each other (See FIG. 12c). As shown in FIG. 12c, the teeth have a shape and orientation such that ratchet components 126 and 128 may rotate with respect to each other in a single direction (toward the closed position) while in the engaged setting. FIGS. 12-14 show biasing component 130 between second ratchet component 128 and second half 115, however, biasing component 130 may be located anywhere known to a person having ordinary skill in the art such that it forces second ratchet component 128 toward first ratchet component 126.

FIGS. 12-14 also show that release button 124 is in contact with second ratchet component 128 when fully assembled and therefore release button 124 is capable of altering the locking mechanism between the engaged and the disengaged setting. The engaged setting is achieved when release button 124 is in the first biased position. The disengaged setting is achieved when release button 124 is in the second urged position forcing second ratchet component 128 to overcome the biasing force created by biasing component 130. FIG. 12c provides an example of ratchet components 126 and 128 in close enough proximity to qualify as an engaged setting, however, the components may be located at a closer proximity while in the engaged setting.

Figure 15:
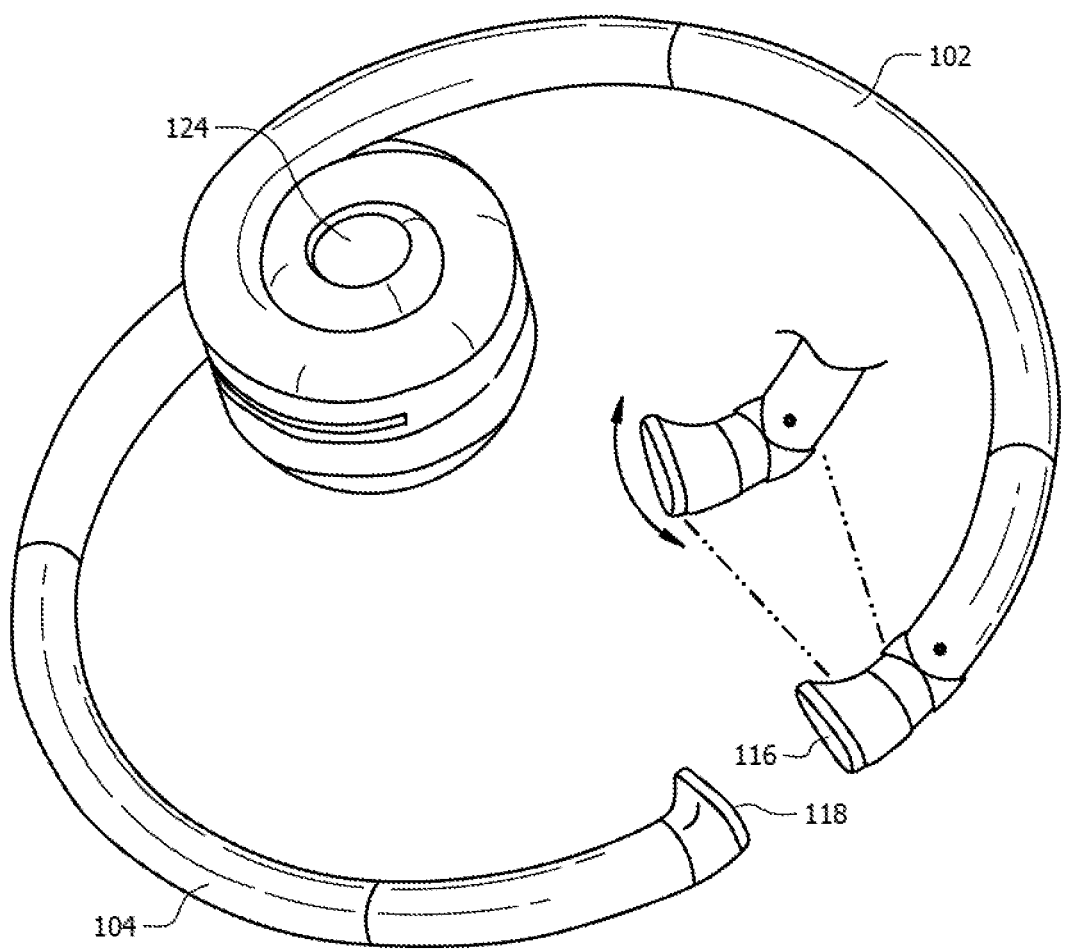
FIG. 15 is a certain embodiment of the present invention having a pivoting contacting surface.

As shown in FIG. 15, a certain embodiment of the present invention may include contacting surface 116 having a pivoting connection to retention arm 102. In a certain embodiment, both of the contacting surfaces may be pivotally connected to the retention arms to allow the contacting surfaces to sit flush with the object being clamped no matter the degree of pivot at which the retention arms are oriented. By enabling the entire contacting surface to sit flush with the object, the contacting surface is able to exercise the maximum clamping and therefore friction force available. If the embodiment has a single pivoting contacting surface, the contacting surface would preferably be attached to the arm intended to sit on top of the surface. This consideration allows the contacting surface of the bottom arm to act as a hook to prevent the bag's straps from falling in case the retention arms rapidly move to a fully open position. In the embodiment having two pivotally connected contacting surfaces, the contacting surfaces may have a limited range of pivot. The limited range of pivot of the contacting surface would improve the friction force capabilities of the clamp while also allowing the contacting surfaces to act as hooks for catching a bag's straps when the arms rapidly move to a fully open position.

Figure 16:
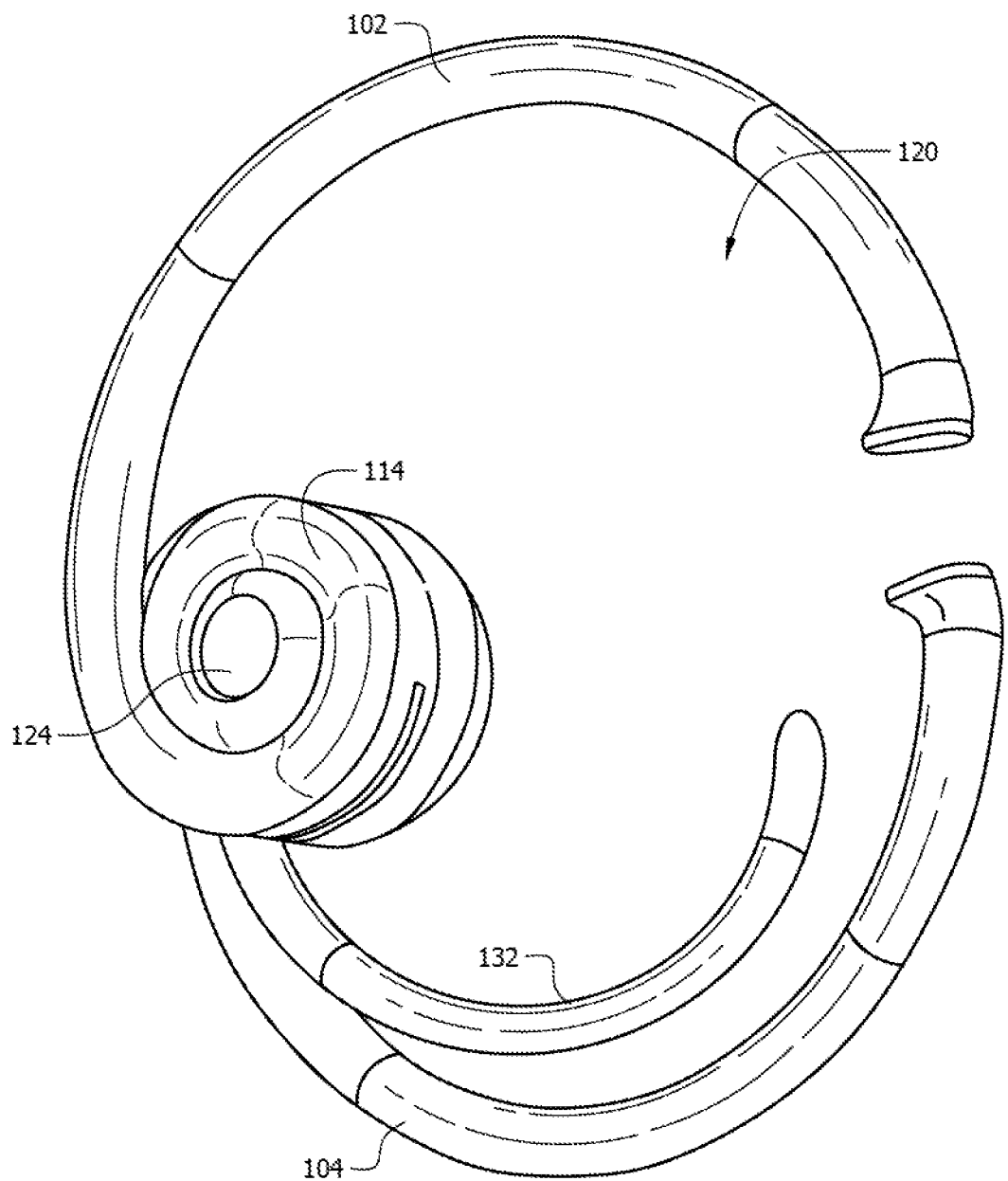
FIG. 16 is a certain embodiment of the present invention having a strap retention member.

As shown in FIG. 16, a certain embodiment of the present invention includes strap retention feature 132 to aid in preventing an inadvertent dropping of the bag upon actuation of the release button. Strap retention feature 132 may be any shape known to a person having ordinary skill in the art and may originate from the mechanism housing as shown in FIG. 16. In a certain embodiment, strap retention feature 132 may originate from the second end of second retention arm 104, or may originate from any location known to a person having ordinary skill in the art such that the straps will be retained if the clamp were to suddenly open to a fully open position. Strap retention feature 132 may be on either or both retention arms 102 and/or 104.

Figure 17:
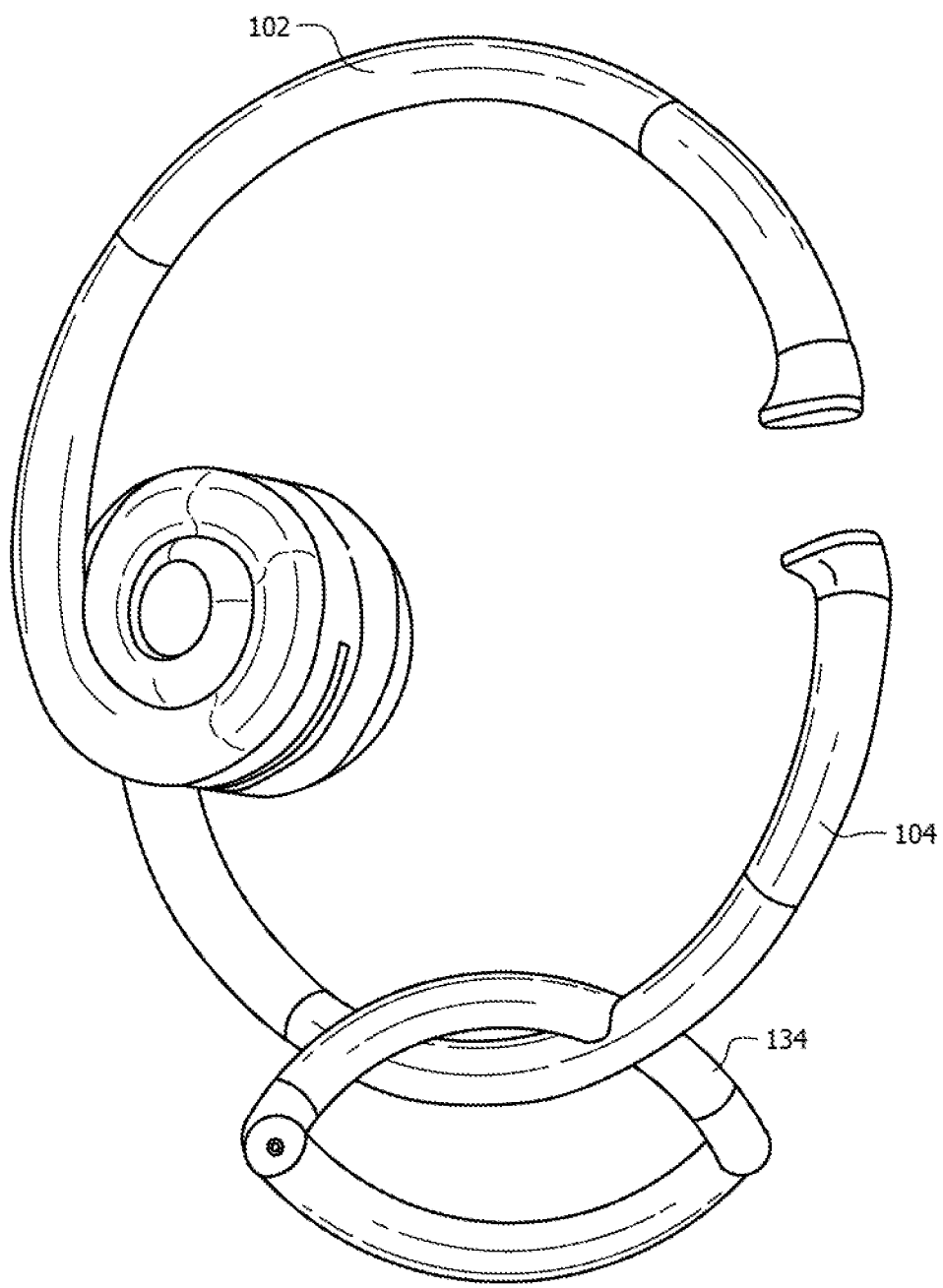
FIG. 17 is a certain embodiment of the present invention having an orientation attachment.

As shown in FIG. 17, the bag clamp may include alternate orientation attachment 134 to alter the orientation of the hanging bag so that the bag's length is generally parallel with bag clamp's retention arms 102 and 104. Alternate orientation attachment 134 may have any known shape so long as alternate orientation attachment 134 is adapted to receive or to connect to one of the retention arms of the bag clamp. Additionally, alternate orientation attachment 134 is preferably capable of opening and locking shut to receive the straps of a bag. Alternate orientation attachment 134 may be fixed or removably attached to any portion of the bag clamp as is known to a person having ordinary skill in the art.

Figure 18:
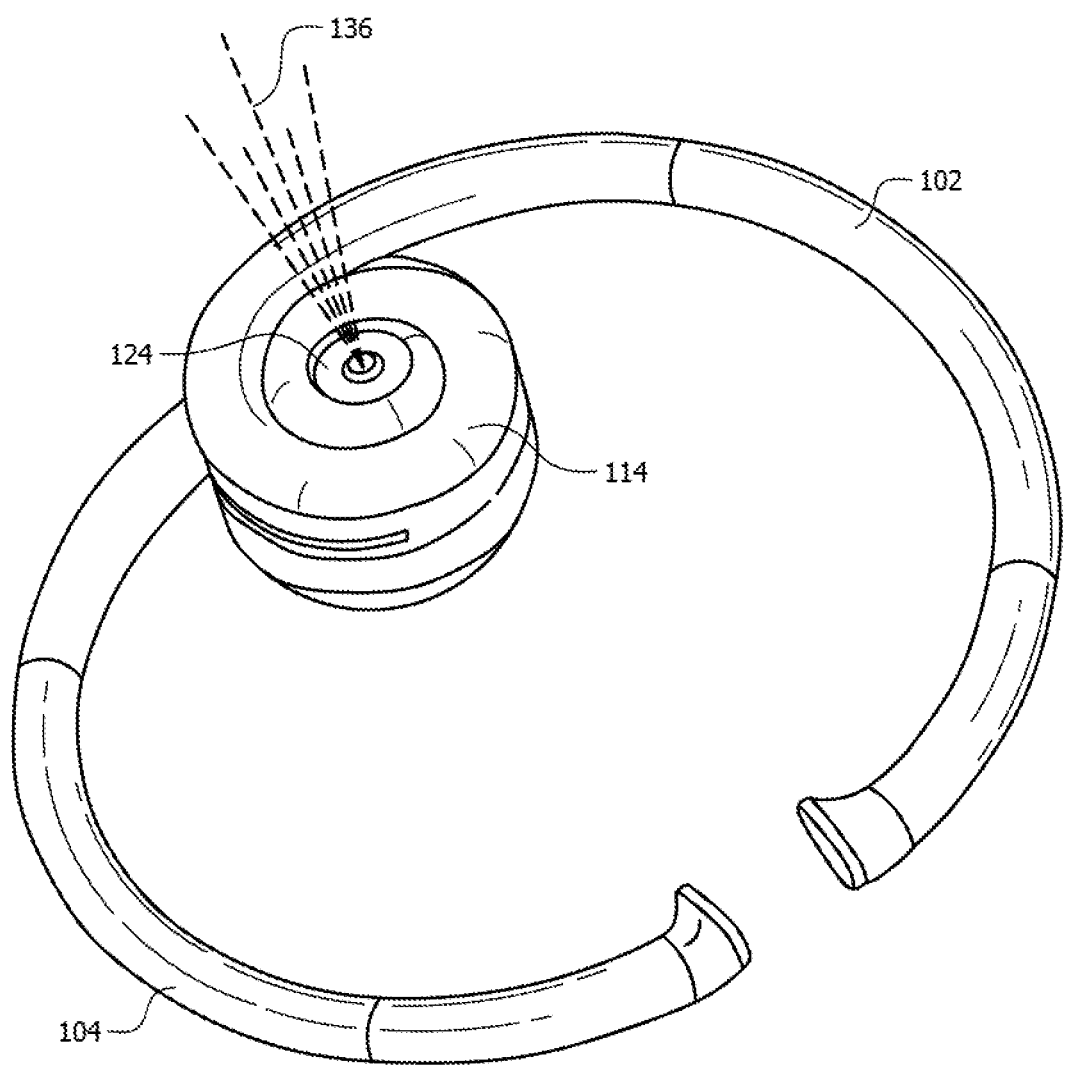
FIG. 18 is a certain embodiment of the present invention having a light transmitting button.

In a certain embodiment, the bag clamp may include visual alert 136 exemplified by rays of light expelled through release button 124, as shown in FIG. 18. Such an embodiment would include a transparent release button or a transparent portion of the release button with a lighting device located inside of the mechanism housing at a distance from the outer surface of the button such that the light created from the lighting device passes through the transparent button or transparent portion of the button. The visual alert may perform any function known to a person having ordinary skill in the art. The visual alert is preferably in communication with the bag clamp's power source (not shown) to notify the user that the power source needs to be replaced or recharged. Additionally, the visual alert may be in communication with a wireless communication module (not shown), such as Bluetooth, to wirelessly connect to the owner's mobile device. The visual alert would relay any notifications that have occurred or are occurring on the owner's mobile device. The visual alert may use any visual effects known to a person having ordinary skill in the art.

Figure 19:
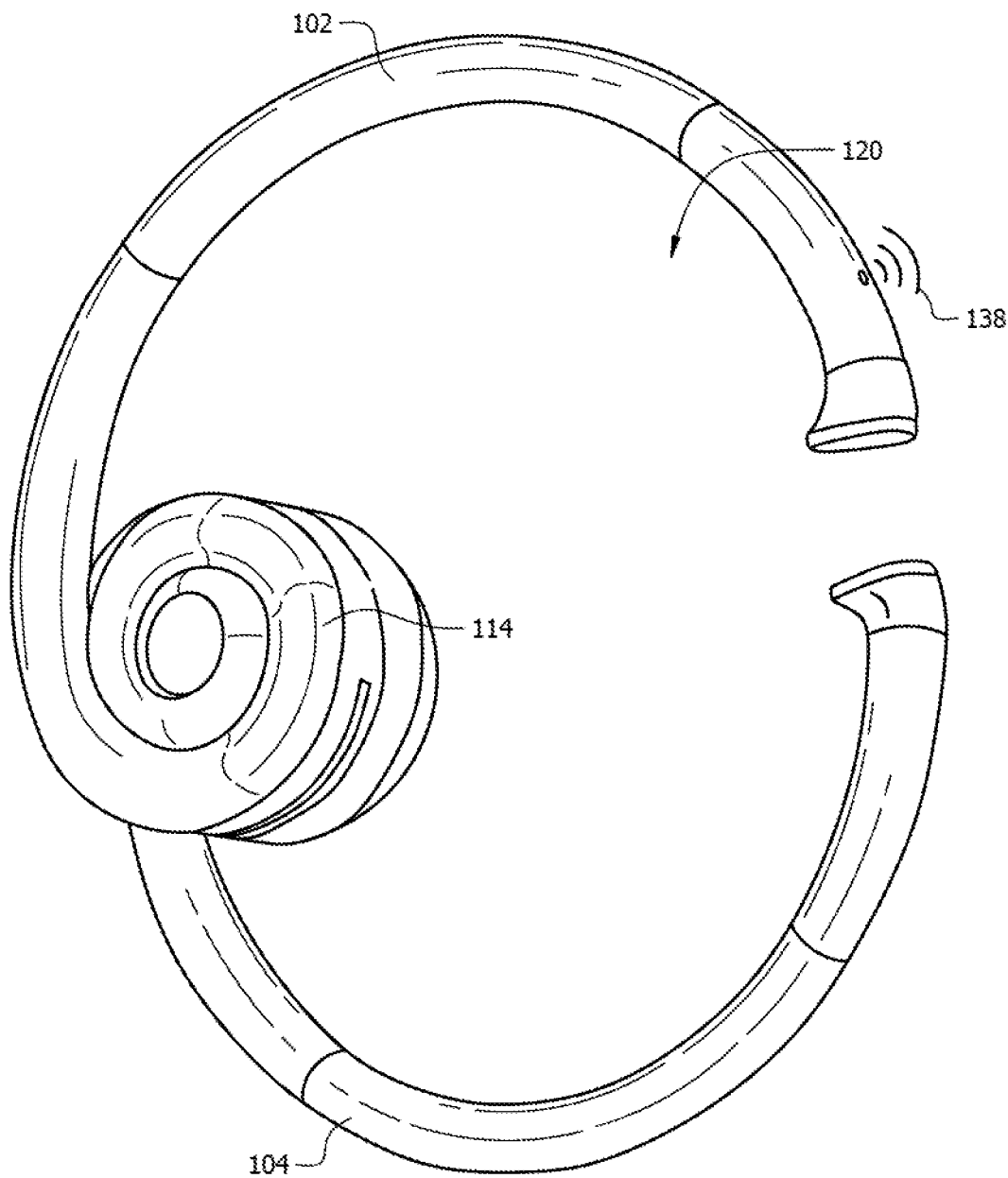
FIG. 19 is a certain embodiment of the present invention having an audible alert.

As shown in FIG. 19, a certain embodiment of the present invention includes audible alert 138, illustrated by sound waves, to alert the owner that an unauthorized attempt has been made to actuate the release button on the clamp. The audible alert is preferably located in retention arm 102, however, it may be located anywhere on the bag clamp, such as the release button or mechanism housing. In this embodiment, the bag clamp may require a specific procedure for unlocking the clamp and the security warning would be activated upon a failure to execute that specific procedure. Additionally, the bag clamp may include an accelerometer that activates the security warning when the bag clamp is forcefully removed from a surface while the clamp is in a locked position. Further considered security measures include a GPS tracking device and a remote activation for the audible alert. These features are considered for tracking down a bag that was previously lost or stolen. In a certain embodiment, the audible alert could be linked to a user's mobile device similar to the visual alert to provide an audible alert to any notifications experienced on the mobile device.

The electrical components, wireless communication module, and power source required in certain embodiments are preferably stored inside the mechanism housing. However, they may be stored in the arms to prevent increasing the size of the mechanism housing.

Figure 20:
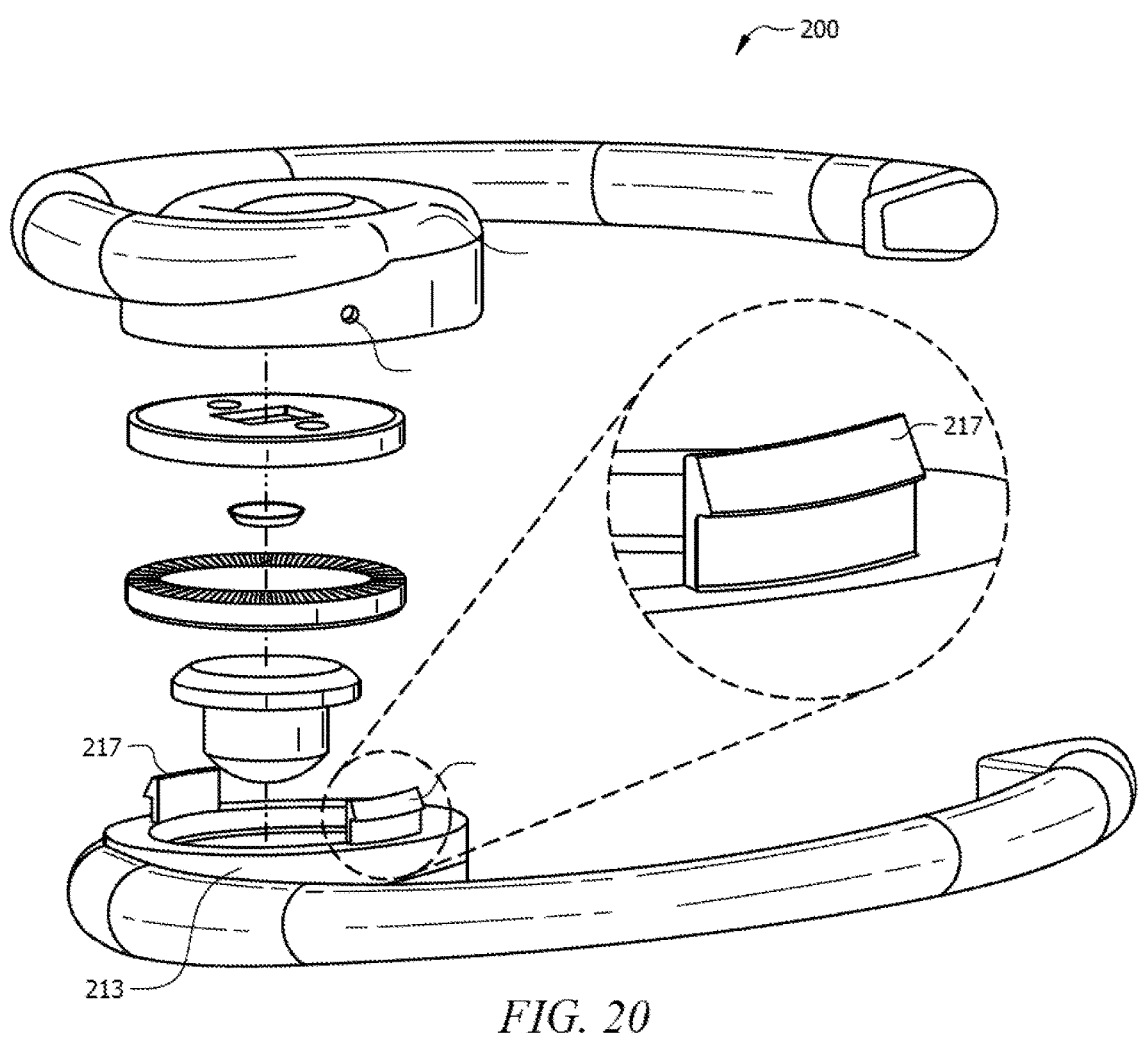
FIG. 20 is an exploded view of a certain embodiment of the present invention including a flexible coupling and internal rim for coupling the two halves of the mechanism housing.

In a certain embodiment, as shown in FIG. 20 and generally denoted by reference numeral 200, the two halves of the mechanism housing 213 and 215 are coupled using flexible couplings 217 that extends toward second half 215. Each flexible coupling 217 has a first resting position and a second flexed position along with a distal end that includes an angled flange. Second half 215 includes an internal rim (shown in FIG. 23 as reference numeral 319) on which the flange of flexible coupling 217, 317 rests when halves 213 and 215 are coupled. The internal rim extends around the internal circumference, or a portion thereof, of second half 215 to allow the arms to rotate with respect to each other while coupled. Second half 215 also includes access 225 allowing an object to be inserted into second half 215 and force flexible coupling 217 into a flexed position when the two are aligned. Flexible coupling 217 is capable of flexing an amount to disengage the flange from the internal rim such that first half 213 may separate from second half 215. In this embodiment, there are two flexible couplings and two accesses, which are capable of simultaneous alignment. In a certain embodiment, there may be any number of flexible couplings and accesses as is known to a person having ordinary skill in the art. Additionally, a certain embodiment may have a flexible access that is capable of disengaging the flange from the rim without the need of an additional object to be inserted into an access.

FIGS. 21-25 illustrate another embodiment, generally denoted by reference numeral 300, having a locking mechanism in the form of an assembly. The assembly includes jamming component 340, jamming release 342, jamming spring 344, mount 346, and platform 348. Mount 346 and platform 348 are secured in second half 315 of the mechanism housing. Mount 346 is adapted to support jamming component 340, which contains a through hole adapted to receive mount 346. Platform 348 is adapted to receive and support one end of jamming spring 344. The other end of jamming spring 344 is in communication with jamming component 340. Jamming component 340 preferably includes overhang 345 extending outward from the outer surface of jamming component 340 in the radial direction. Overhang 345 includes an insert for receiving jamming spring 344.

Figure 21:
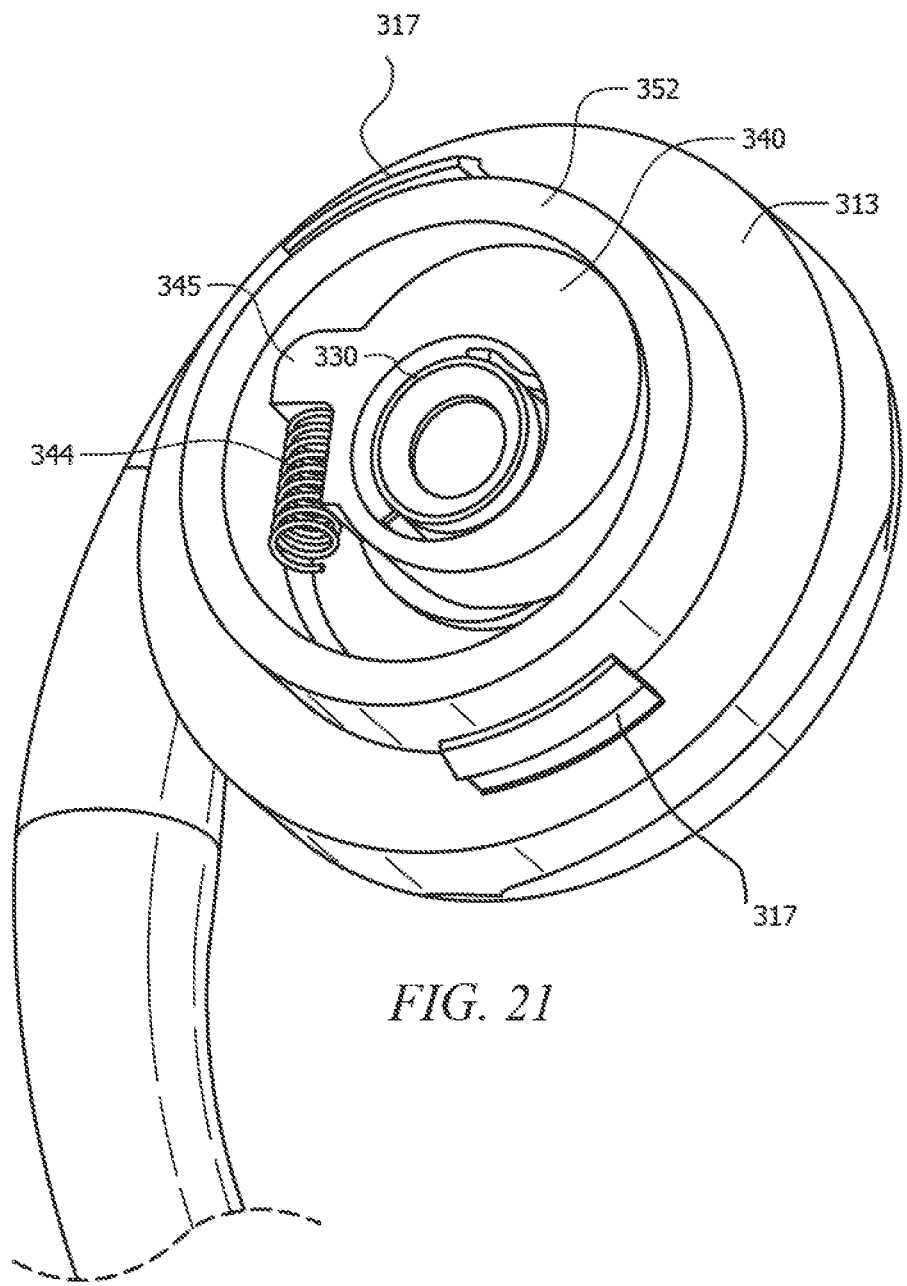
FIG. 21 depicts the first half of the mechanism housing having an embodiment of a assembly locking mechanism.

As shown in FIG. 21, jamming component 340 has an outer surface of a generally circular shape, excluding the overhang, and a corresponding central longitudinal axis. The through hole has central longitudinal axis that is offset from the central longitudinal axis corresponding to the outer surface. Jamming component 340 rotates about the central longitudinal axis of the through hole (hereinafter rotational axis) to create an eccentric or off-center rotation. In a certain embodiment, the jamming component has an ovoid shape to increase the effects of the off-center rotation. The rotational axis is preferably aligned with the rotational axes of the arms and the longitudinal axes of release button 324 and jamming release 342, however the alignment is not necessary. The off-center through hole results in some portion of the outer surface of jamming component 340 being a greater distance from the rotational axis than other portions of the outer surface of jamming component 340.

Figure 22:
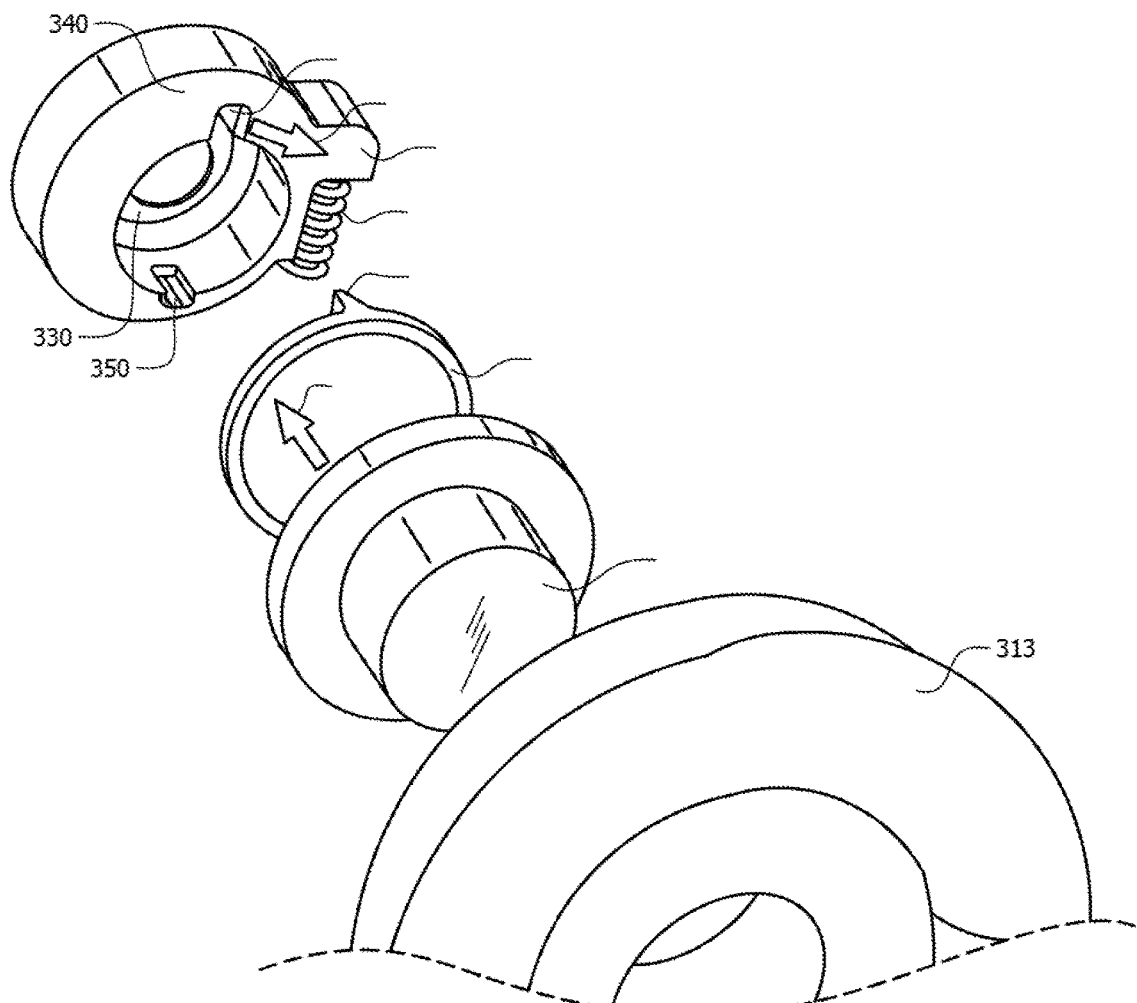
FIG. 22 is a partial exploded of the locking mechanism from FIG. 21 illustrating the function of the jamming release upon actuation of the release button.

Illustrated in FIG. 22 jamming release 342 is in communication with biasing component 330 and release button 324. Biasing component 330 is also in communication with second half 315 and is applying a biasing force on jamming release 342 to force it away from second half 315, which in turn forces release button 324 away from second half 315. Jamming release 342 includes two angled wedges 343 having a predetermined length. Both jamming component 340 and mount 346 include corresponding wedge receipts 350. When the bag clamp is assembled, at least some portion of wedges 343 are in communication with corresponding wedge receipts 350 to prevent excessive rotation. Wedges 343 are angled and wedge receipts 350 are beveled such that jamming component 340 rotates into alignment, illustrated by arrow 360, as jamming release 342 is forced toward second half 315, illustrated by arrow 365 The same features of wedges 343 and wedge receipts 350, allow jamming component 340 to rotate slightly when wedges 343 are only partially received by wedge receipts 350. The rotation is the result of jamming spring 344 exerting a spring force on platform 348 and overhang 345 creating a moment about the rotational axis.

Figure 23:
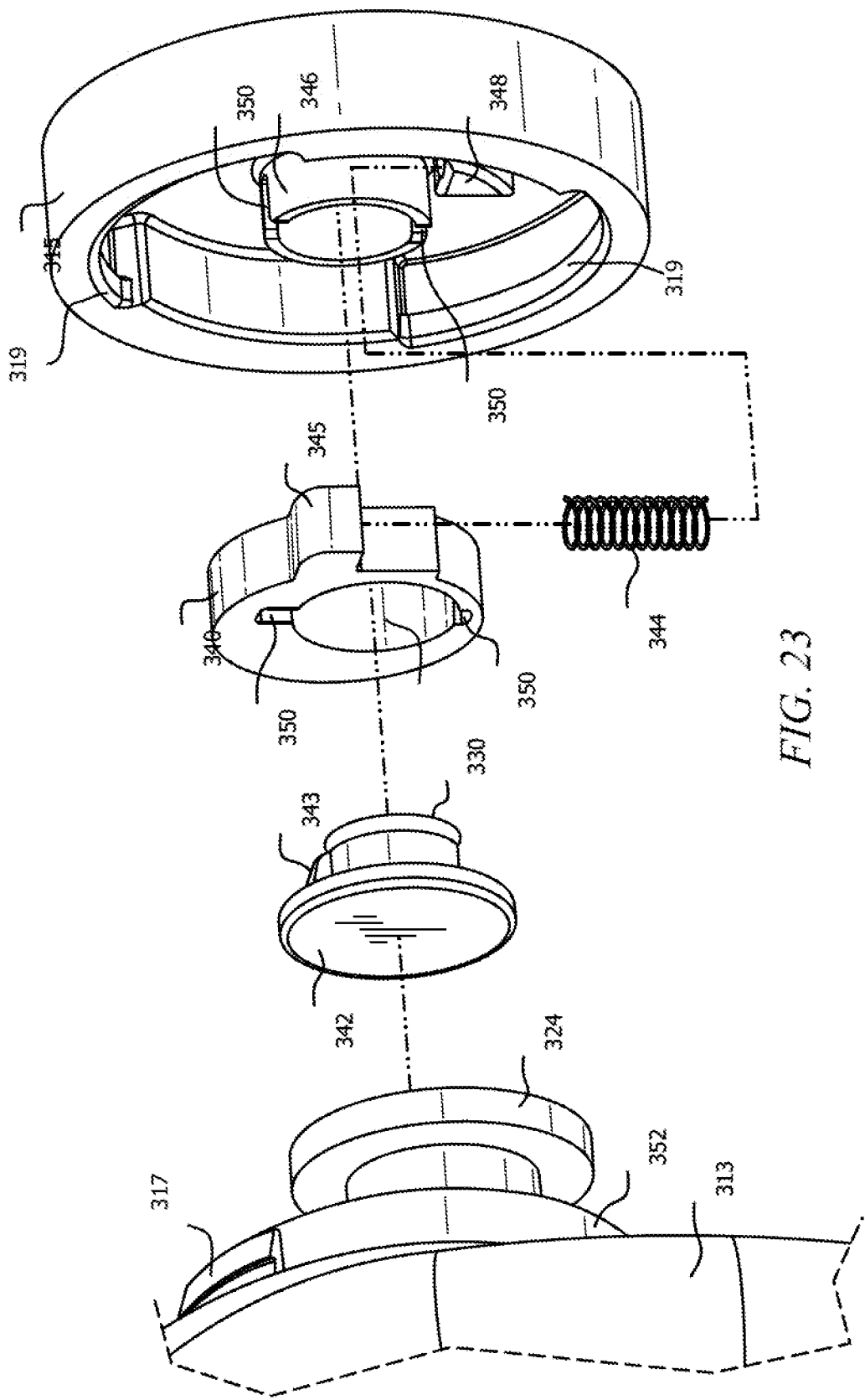
FIG. 23 is a side perspective of the exploded view of the locking mechanism depicted in FIG. 21.
Figure 24:
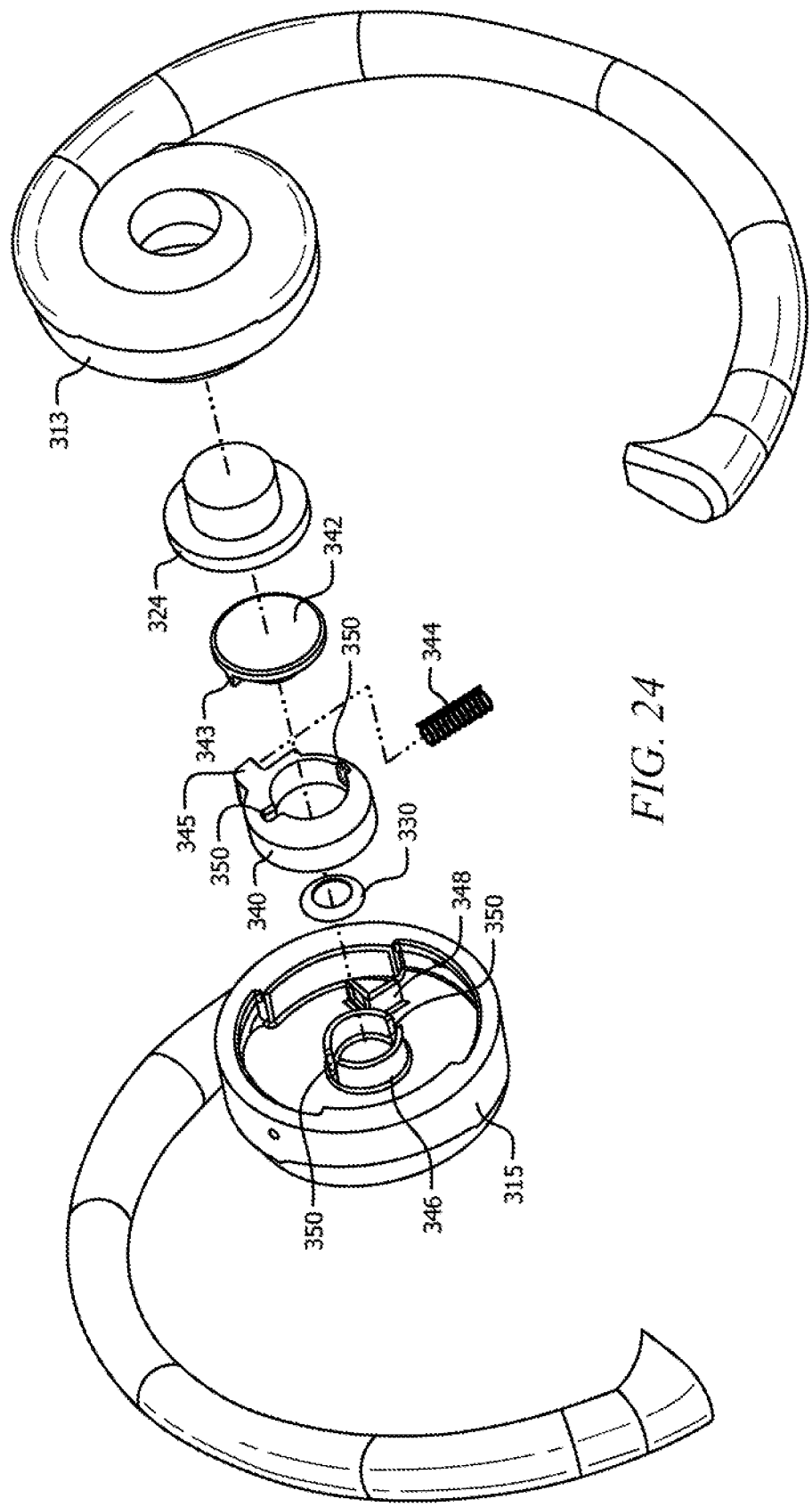
FIG. 24 is a front exploded perspective view of the locking mechanism depicted FIG. 21.
Figure 25:
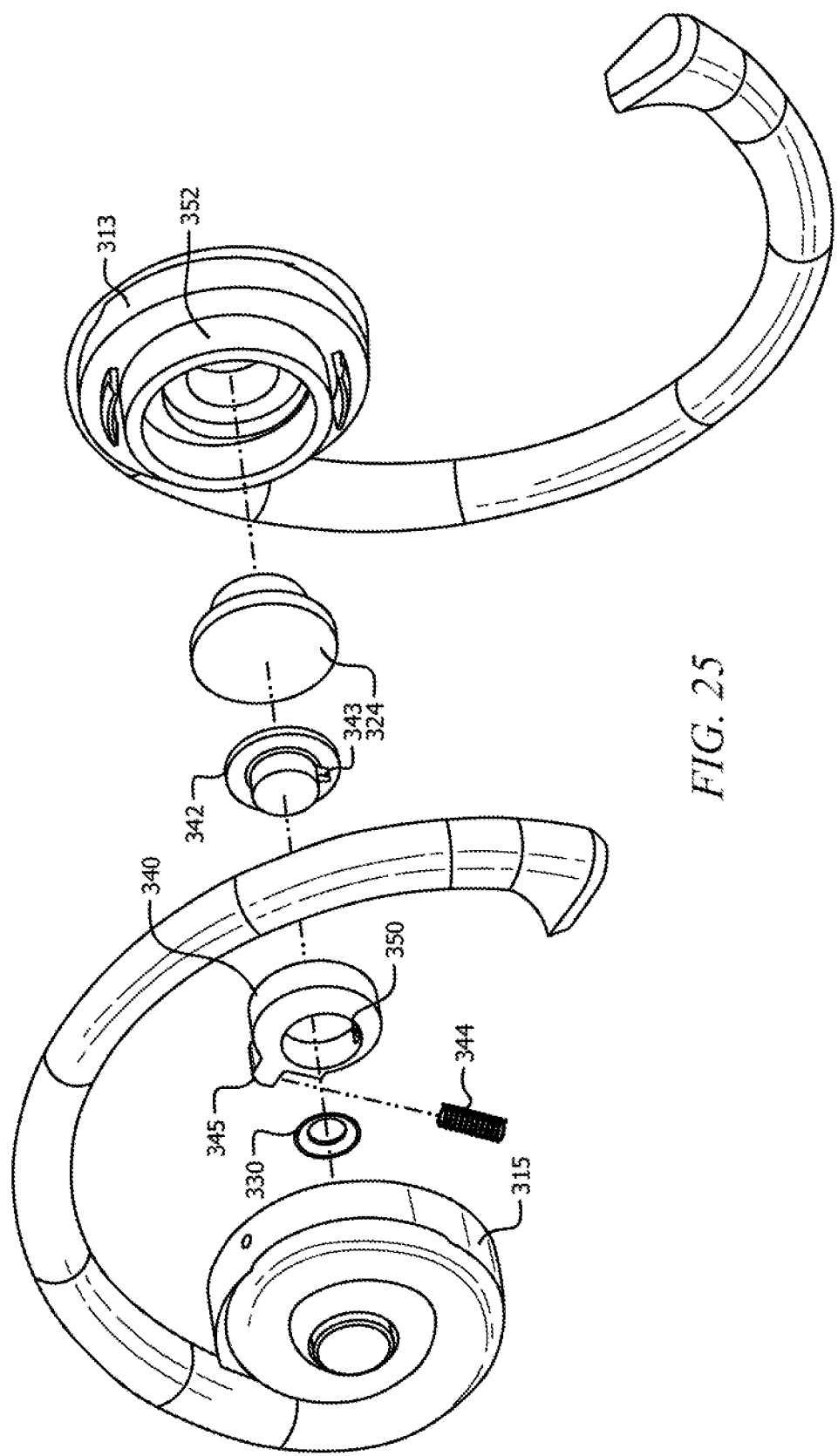
FIG. 25 is a rear exploded perspective view of the locking mechanism depicted FIG. 21.

As shown in FIGS. 21, 23, and 25, first half 313 of the mechanism housing includes cylindrical extension 352 adapted for receipt by second half 315. Cylindrical extension 352 has a central longitudinal axis out of alignment with the rotational axis of jamming component 340. Moreover, cylindrical extension 352 has an inner diameter of a size such that the outer circumference of jamming component 340 does not frictionally secure cylindrical extension 352 when jamming release 342 is forced toward second half 315 such that wedges 343 align wedge receipts 350. Additionally, the inner diameter of cylindrical extension 352 has a size such that jamming component 340 frictionally secures cylindrical extension 352 when jamming release 342 is forced away from second half 315 such that wedges 343 remain only partially inserted into wedge receipts 350 and jamming spring 344 rotates jamming component 340.

The assembly is in a disengaged setting when release button 324 is forced toward second half 315, in turn forcing jamming release 342 toward second half 315 to overcome the biasing force exerted by biasing component 330. As release button 324 moves toward second half 315, wedges 343 on jamming release 342 further penetrate wedge receipts 350. The wedge shapes of wedges 343 cause wedge receipts 350 to align and jamming component 340 rotates to overcome the moment being exerted by jamming spring 344. The orientation of jamming component 340 when rotated to align wedge receipts 350 is such that jamming component 340 is no longer in a frictionally securing contact with cylindrical extension 352. The two halves 313, 315 and their respective arms are free to rotate with respect to each other and the assembly is considered to be disengaged.

The assembly is in an engaged setting when biasing component 330 forces jamming release 343, and in turn release button 324, away from second half 315. As a result, wedges 343 remain only partially inserted into wedge receipts 350 and jamming component 340 is forced to rotate due to the moment created by jamming spring 344. The wedge or angled shape of wedges 343 allow wedges 343 to remain partially inserted into wedge receipts 350 while also allowing jamming component 340 to rotate. Jamming component 340 is only capable of rotating a limited number of degrees, about eleven degrees, which is based on the width of the wedges and the width of the wedge receipts. Jamming component 340 only needs to rotate an amount such that jamming component 340 can achieve a frictionally securing contact with cylindrical extension 352. The off-center rotation shape causes the jamming component to jam into the cylindrical extension after small degree of rotation to prevent the two arms from rotating with respect on one another. The prevention of rotation is referred to as the engaged setting. In a certain embodiment, the jamming component may be in contact with the cylindrical extension without frictionally securing the jamming component, due to the contact being minimal.

In a certain embodiment, there may be any number of wedges and corresponding wedge receipts. Additionally, the shape of the jamming component, width of the wedge receipts, and the shape of the wedges can be altered as is known to a person having ordinary skill in the art such that the assembly has both an engaged and a disengaged setting. In a certain embodiment, the jamming release and release button may be a single structure.

Referring now to FIGS. 26-31, another embodiment of the present invention, generally denoted by reference numeral 400, includes an assembly designed to permit rotation of retention arms 402, 404 toward the closed position, while preventing rotation toward the open position. The design incorporates fewer parts, with each part having a simpler design than the previous embodiments to reduce the cost of manufacturing and assembly.

As shown in FIGS. 26-31, the assembly includes jamming component 440, jamming spring 444, release button 424, and button biasing component 430, all enclosed within the two halves 413, 415 of the mechanism housing. Once assembled, dog-point set screw 425 secures the housings 413, 415 together while allowing the two to rotate with respect to each other. In an embodiment, the halves 413, 415 may be secured in any manner known to a person of ordinary skill in the art, so long as the halves maintain the ability to rotate with respect to each other when the assembly allows rotation.

Figure 26:
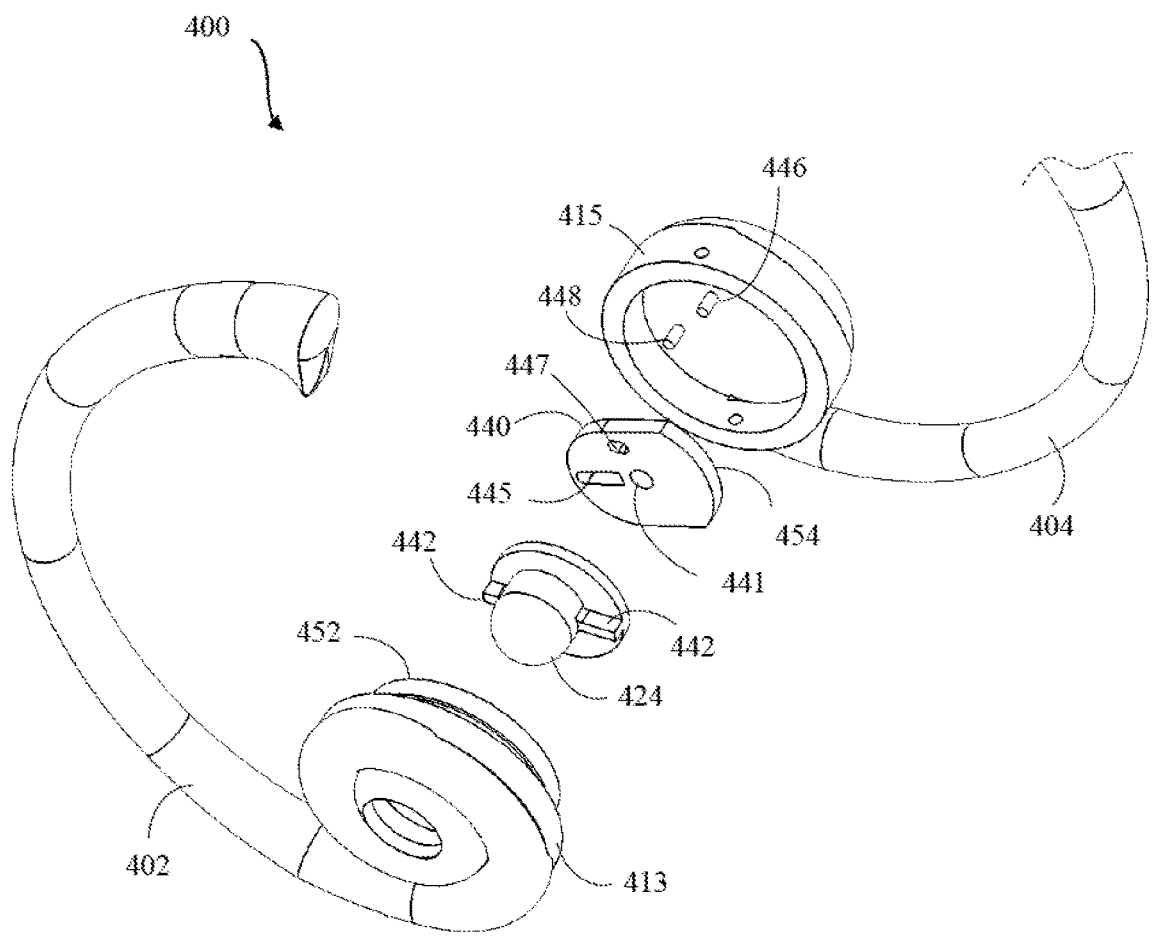
FIG. 26 is a front exploded perspective view of an embodiment of locking mechanism.
Figure 27:
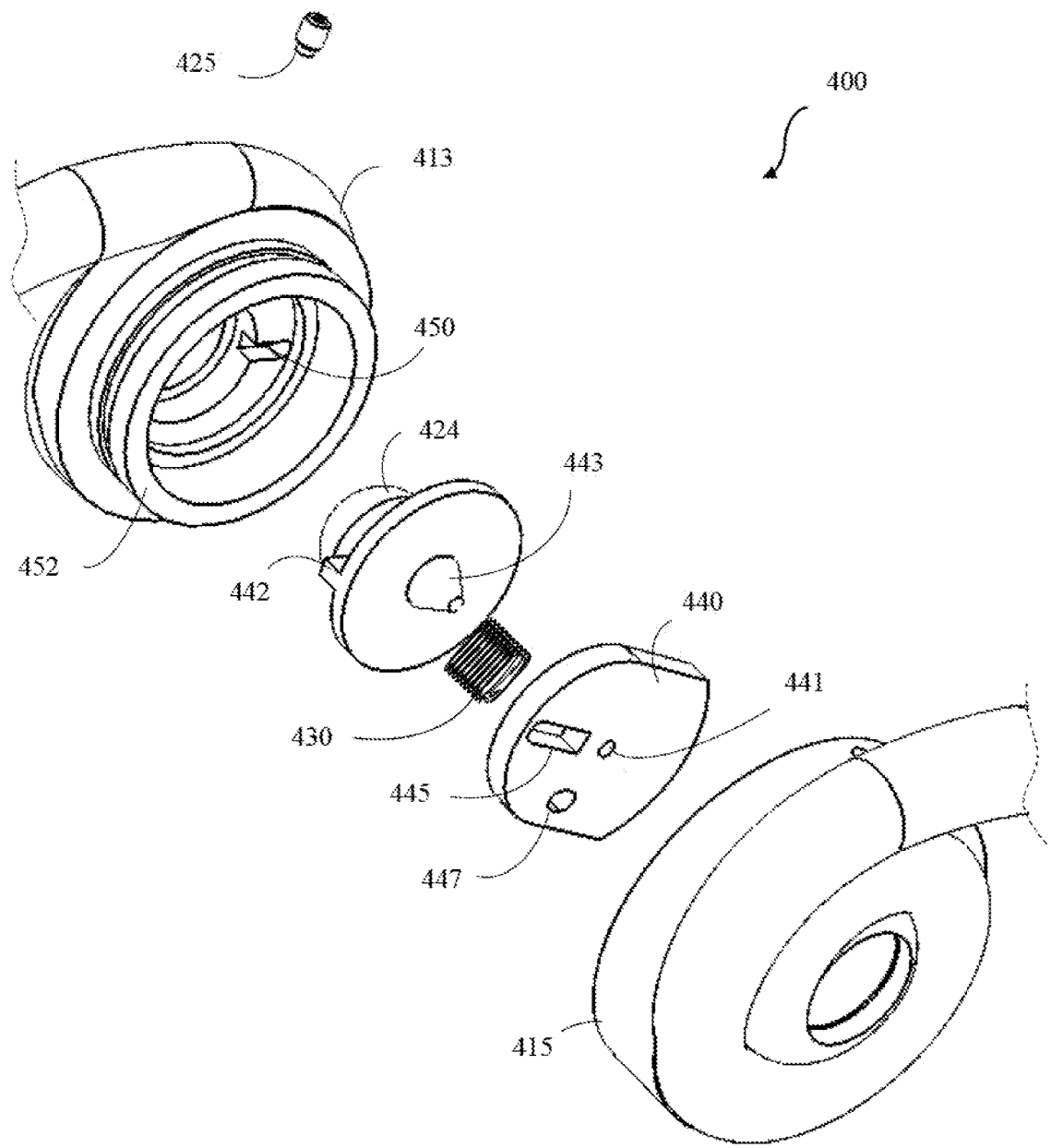
FIG. 27 is a rear exploded perspective view of the embodiment of locking mechanism depicted in FIG. 26.

As most clearly shown in FIGS. 26-27, release button 424 includes flanges 442 configured to be received by recesses 450 within housing 413. Flanges 442 and recesses 450 maintain alignment of release button 424 with housing 413. Flanges 442 are preferably sized such that the flanges remain at least partially within recesses 450 even when release button 424 is in the urged position.

Figure 30:
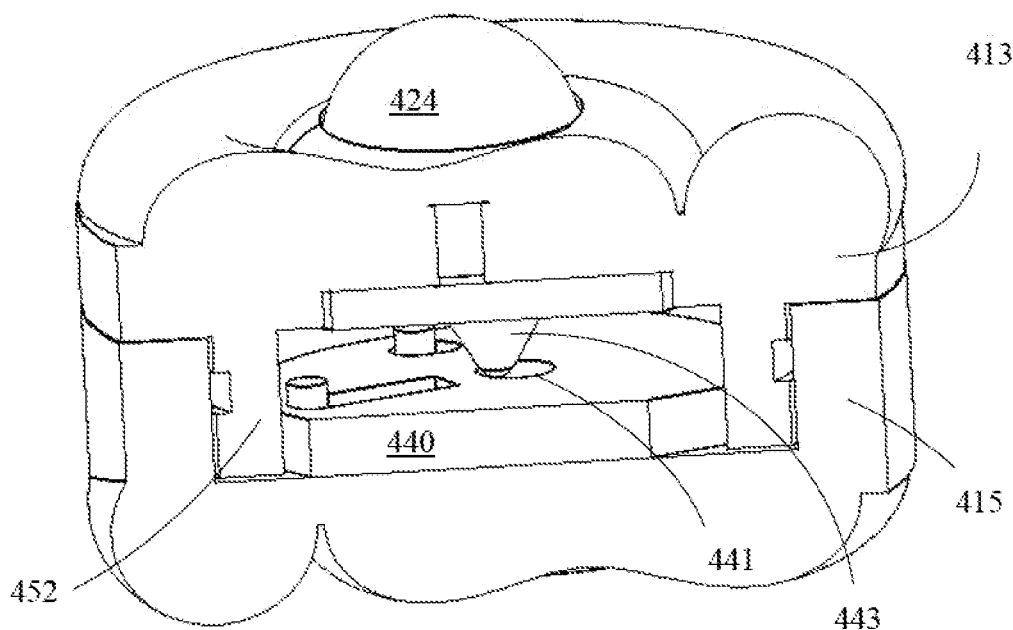
FIG. 30 is a side sectional view of the locking mechanism depicted in FIG. 26.

An upper end of release button 424 passes through housing 413, as best shown in FIG. 30, to enable a user to force release button 424 toward jamming component 440. Button biasing component 330, as depicted in FIG. 27, is disposed between release button 424 and jamming component 440 and is configured to avoid interference with conical member 443 extending from a bottom surface of release button 424. Button biasing component 330 forces release button 424 away from jamming component 440 into a position of repose.

Jamming component 440 includes frustoconical aperture 441 located generally in the center of jamming component 440. Frustoconical aperture 441 is configured to receive conical member 443 on release button 424 when release button 424 is forced from its position of repose toward jamming component 440. As conical member 443 further penetrates frustoconical aperture 441, jamming component 440 is forced into a position aligning conical member 443 and frustoconical aperture 441.

Figure 28:
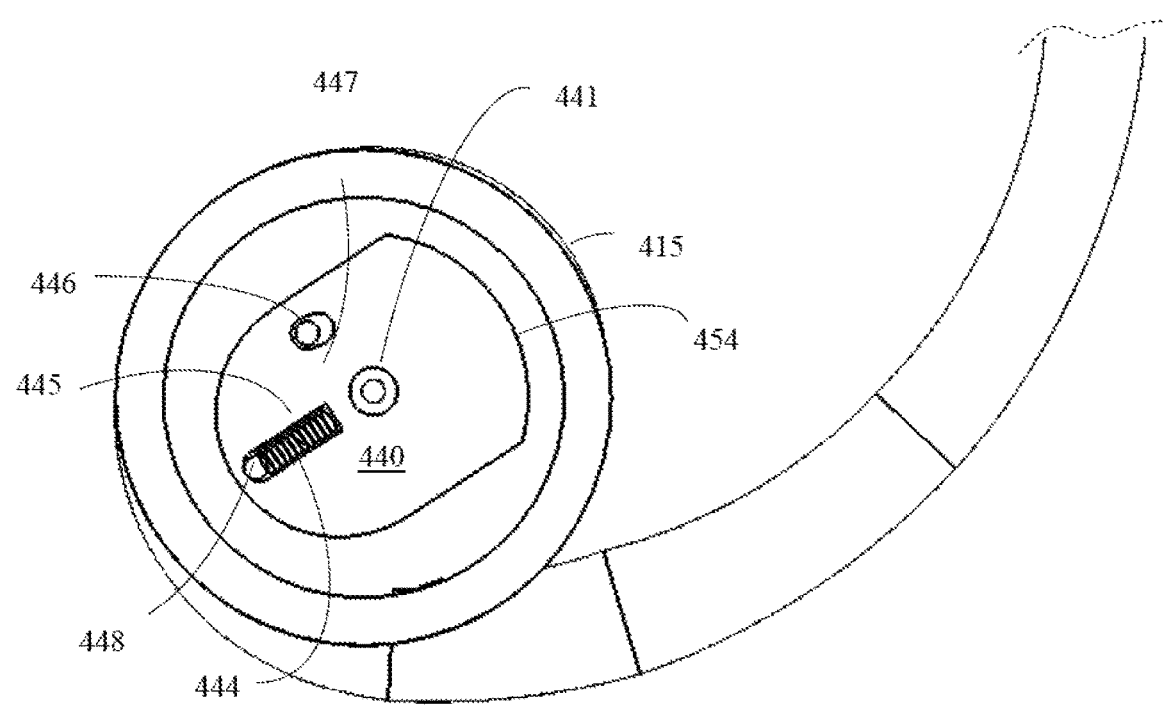
FIG. 28 is front view of the jamming component depicted in FIG. 26 disposed in half of the mechanism housing.

Jamming component 440 further includes jamming spring receipt 445, jamming pin receipt 447, and contacting lateral surface 454. As shown in FIG. 28, jamming component 440 is designed to fit within mechanical housing 415 with jamming spring receipt 445 and jamming pin receipt 447 respectively receiving spring pin 448 and jamming pin 446. Jamming pin 446 and spring pin 448 each extend axially from an internal surface of mechanical housing 415, as depicted in FIGS. 26 and 28. Spring pin 448 acts as a structural member on which a first end of jamming spring 444 rests. In addition, spring pin 448 establishes a point about which jamming component 440 rotates. Jamming pin 446, in conjunction with jamming pin receipt 447, provides a structural member to prevent rotation of jamming component 440 beyond a desired degree of rotation.

Figure 29:
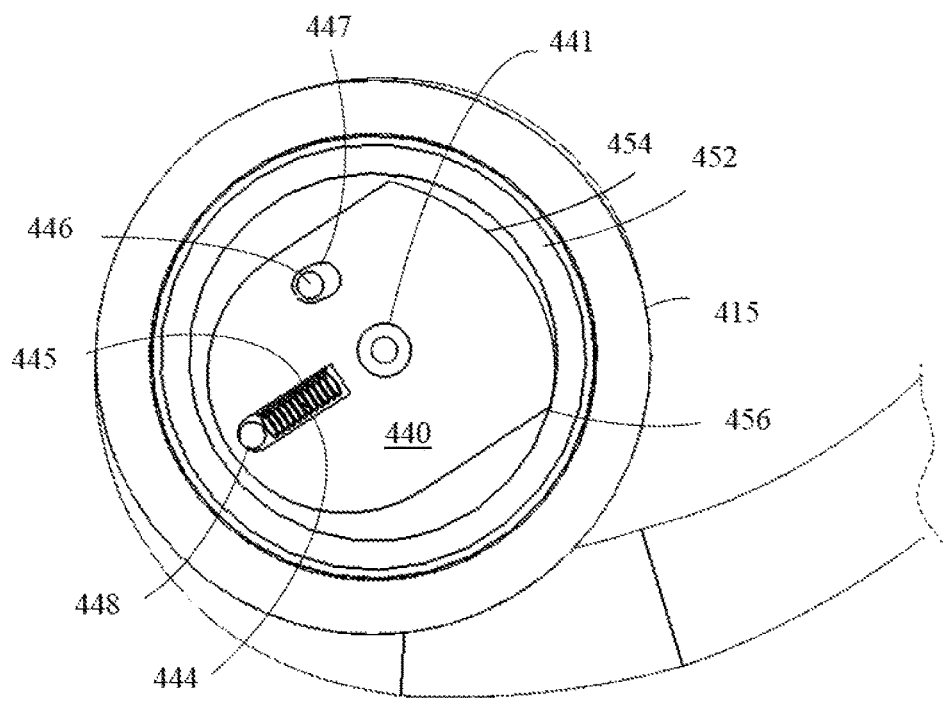
FIG. 29 is a front sectional view of the locking mechanism depicted in FIG. 26 with the jamming component in the engaged setting.

As shown in FIG. 29, jamming spring receipt 445 is sized to receive jamming spring 444 in addition to spring pin 448. Jamming spring 444 is in a compressed position of repose, which forces contacting surface 454 in a radial direction causing contacting surface 454 to come into contact with cylindrical extension 452, which extends from housing 413 into housing 415 as depicted in FIG. 30. Jamming component 440 is in an engaged setting when jamming component 440 is in contact with cylindrical extension 452.

Referring back to FIG. 29, jamming component 440 has a length extending from contacting surface 454 to a back end diametrically opposed, with respect to frustoconical aperture 441, to contacting surface 454. The length of jamming component 440 is less than the inner diameter of cylindrical extension 452 on housing 413. In addition, contacting surface 454 is curved similar to the curvature of cylindrical extension 452. Curved contacting surface comes to a corner at jamming corner 456. The curvature of contacting surface 454 allows cylindrical extension 452, and in turn arm 402, to rotate in the closed direction—the clockwise direction from the viewpoint presented in FIG. 29—when jamming component 440 is in the engaged setting. Jamming corner 456, however, prevents rotation of cylindrical extension 452, and in turn arm 402, in the open direction—the counter-clockwise direction from the viewpoint presented in FIG. 29—when jamming component 440 is in the engaged setting. The oblique jamming corner 456 catches on cylindrical extension 452 when cylindrical extension 452 is rotated towards the open position. As a result, jamming component 440 rotates about spring pin 448 until jamming pin receipt 447 contacts jamming pin 446. At which point, jamming corner 456 binds into cylindrical extension 452, thus preventing further rotation in the open direction.

Figure 31:
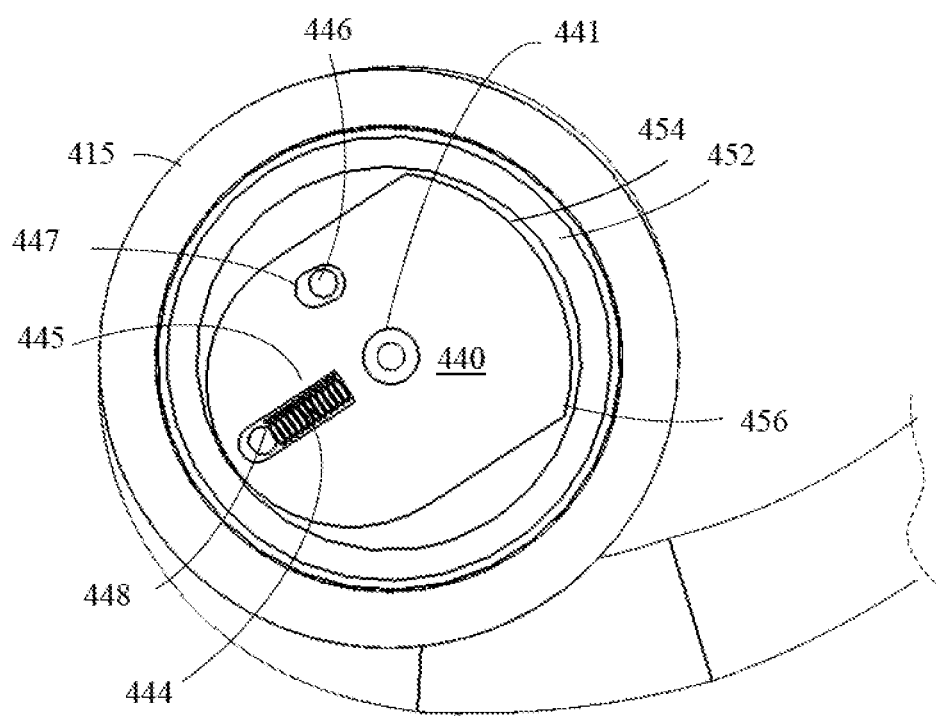
FIG. 31 is a front sectional view of the locking mechanism depicted in FIG. 26 with the jamming component in a disengaged setting.

As depicted in FIG. 30, frustoconical aperture 441 is misaligned with conical member 443 when jamming component 440 is in the engaged setting. It should be noted that biasing component 430 is not visible in FIG. 30 to clearly reveal the misalignment, but biasing component is disposed between release button 424 and jamming component 440. When release button 424 is forced into an urged position toward jamming component 440, conical member 443 forces frustoconical aperture 441 into alignment. As a result of the alignment, jamming spring 444 is compressed and contacting surface 454 and jamming corner 456 are pulled away from cylindrical extension 452, as shown in FIG. 31. Jamming component 440 is in the disengaged setting when release button 424 is in the urged position. When the jamming component 440 is in the disengaged position, cylindrical extension 452, and in turn arm 402, can freely rotate in the open direction—the counter-clockwise direction from the viewpoint presented in FIGS. 29 and 31.

In an embodiment, jamming pin receipt 447 is cattycorner from, and angled or curved toward, jamming corner 456 in a direction moving toward contacting surface 454. The angle or curvature allows jamming pin 446 to easily translate within jamming pin receipt 447 as jamming component 440 rotates. Moreover, the curvature of contacting surface 454 is preferably less than the curvature of cylindrical extension 452.

Figure 32:
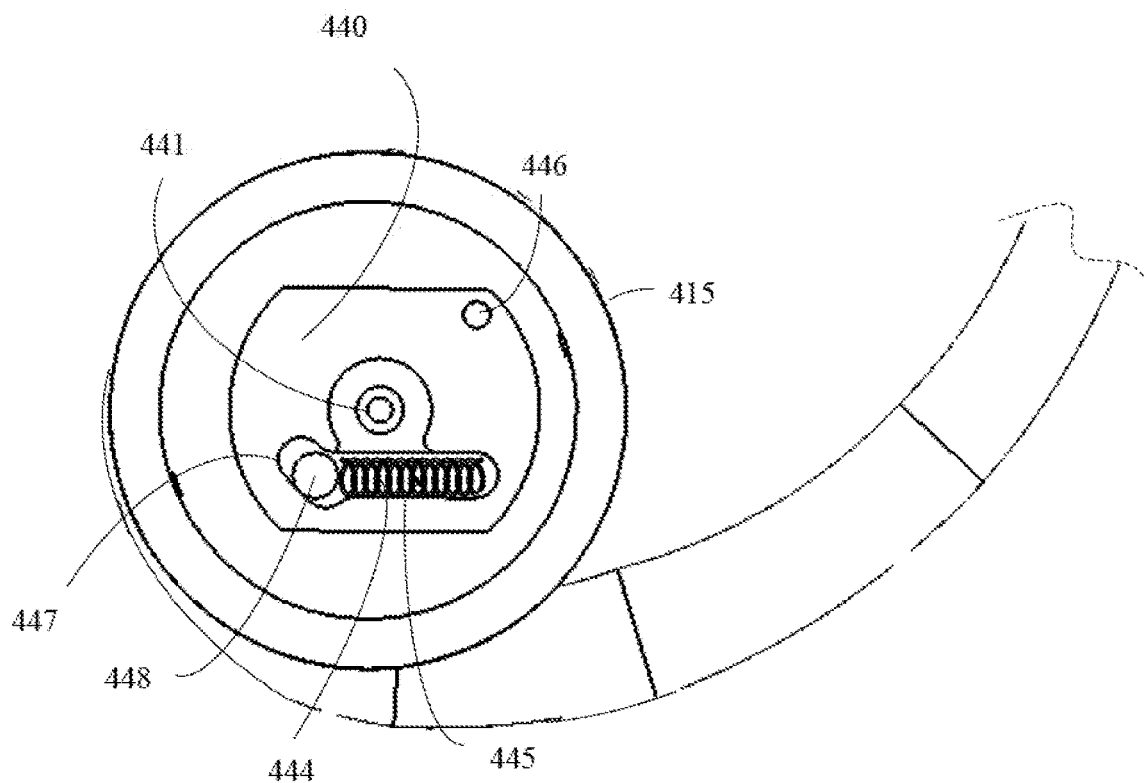
FIG. 32 is front view of an embodiment of the jamming component disposed in half of the mechanism housing.
Figure 33:
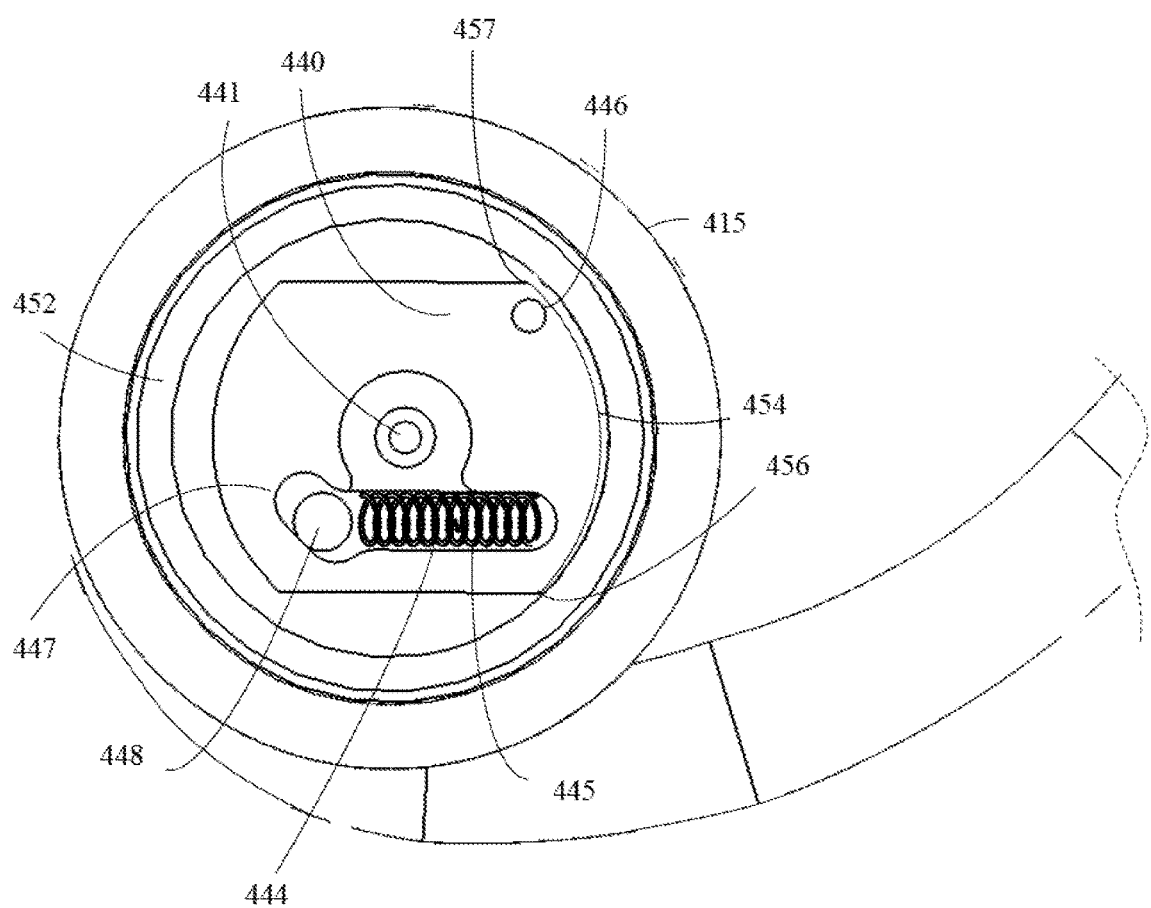
FIG. 33 is a front sectional view of the locking mechanism depicted in FIG. 32 with the jamming component in the engaged setting.
Figure 34:
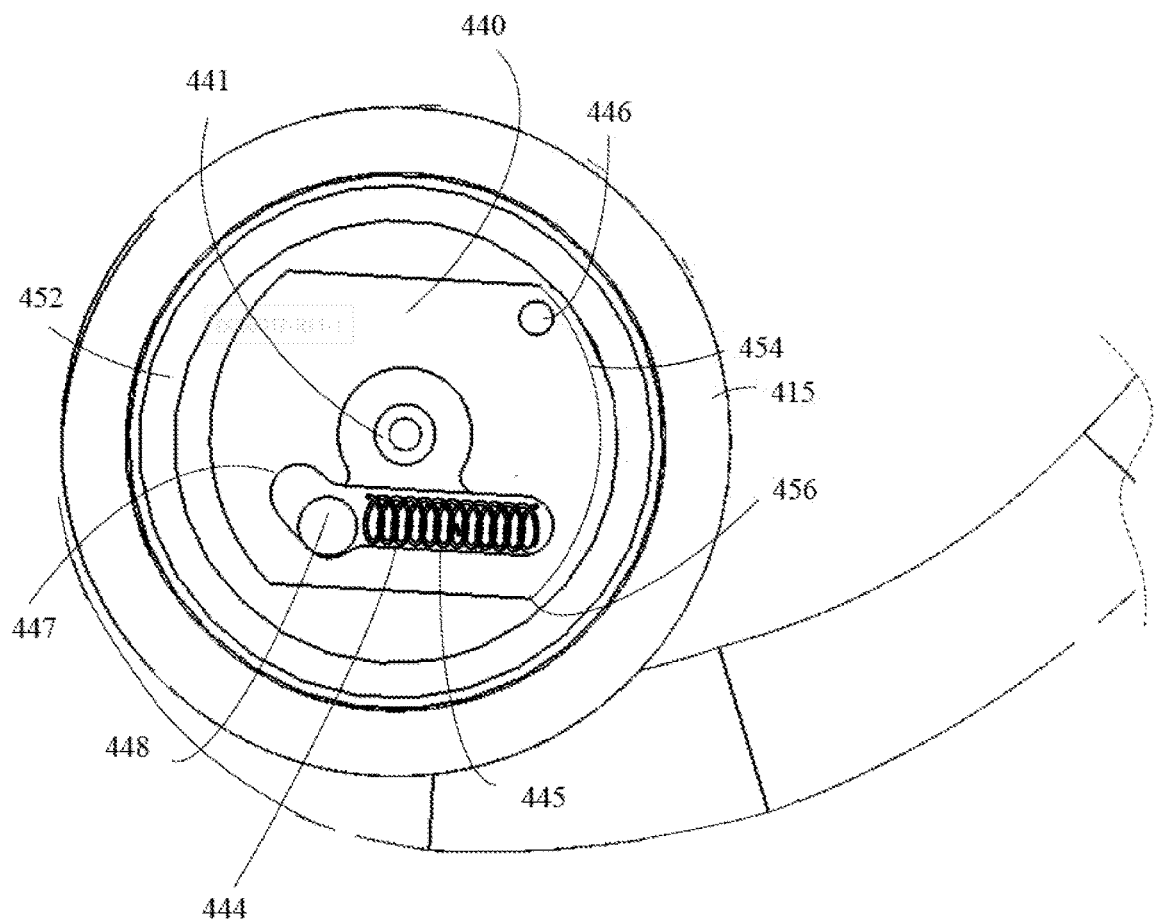
FIG. 34 is a front sectional view of the locking mechanism depicted in FIG. 32 with the jamming component in a disengaged setting.

FIGS. 32-34 depict a variation of jamming component 440 disclosed in FIGS. 26-31. The main differences in the embodiment depicted in FIGS. 32-34 is the alteration of jamming spring receipt 445, jamming pin receipt 447, jamming pin 446 and spring pin 448. In the current embodiment, jamming spring receipt 445 and jamming pin receipt 447 are combined causing spring pin 448 to provide the jamming functionality, while pin 446 acts as a pivot pin about which jamming component 440 can rotate. Both spring pin 448 and jamming pin 446 remain secured to housing 415.

Pivot pin 446 is preferably located proximate to corner 457 to ensure that corner 457 remains a set distance from cylindrical extension 452. This desired location of pivot pin 446 helps ensure that jamming corner 456 remains the only surface capable of jamming into cylindrical extension 452, and also establishes a more definitive rotation in comparison to the embodiment in FIGS. 26-31.

Jamming pin receipt 447, which is now an extension of jamming spring receipt 445, is angled and/or curved to act as a guide or track in directing the rotation of jamming component 440 about pivot pin 446. Depending on the relative viewpoint, jamming pin receipt 447 translates around spring pin 448 or spring pin 448 translates through jamming pin receipt 447 as jamming component 440 pivots about pivot pin 446. As most clearly depicted in FIG. 33, jamming pin receipt 447 has a length great enough to ensure that jamming corner 456 makes contact with cylindrical extension 452 before spring pin 448 contacts a back end of jamming pin receipt 447. This design further ensures that jamming component 440 will remain functional as jamming corner wears down over time. The longer the jamming pin receipt 447, the less susceptible the device will be to the eroding of jamming corner 456.

Referring now to FIGS. 33-34, jamming component 440 operates in the same manner as the embodiment depicted in FIGS. 26-31. The curvature of contacting surface 454 allows cylindrical extension 452, and in turn arm 402, to rotate in the closed direction—the clockwise direction from the viewpoint presented in FIGS. 33-34—when jamming component 440 is in the engaged setting. Jamming corner 456, however, prevents rotation of cylindrical extension 452, and in turn arm 402, in the open direction—the counter-clockwise direction from the viewpoint presented in FIGS. 33-34—when jamming component 440 is in the engaged setting. The oblique jamming corner 456 catches on cylindrical extension 452 when cylindrical extension 452 is rotated towards the open position, thus preventing further rotation in the open direction.

The embodiment depicted in FIGS. 33-34 also relies on frustoconical aperture 441 being misaligned with conical member 443 (see FIG. 30) when jamming component 440 is in the engaged setting. It should be noted that biasing component 430 is not visible in FIG. 30 to clearly reveal the misalignment, but biasing component is disposed between release button 424 and jamming component 440. When release button 424 is forced into an urged position toward jamming component 440, conical member 443 forces frustoconical aperture 441 into alignment. As a result of the alignment, jamming spring 444 is compressed and contacting surface 454 and jamming corner 456 are pulled away from cylindrical extension 452, as shown in FIG. 34. Jamming component 440 is in the disengaged setting when release button 424 is in the urged position. When the jamming component 440 is in the disengaged position, cylindrical extension 452, and in turn arm 402, can freely rotate in the open direction—the counter-clockwise direction from the viewpoint presented in FIGS. 33-34.

In an embodiment, the bag clamp includes a secondary locking mechanism designed to release the clamp in stages rather than completely disengaging the locking mechanism so that the arms rotate to the fully open position. This feature prevents the clamp from quickly opening to the fully open position where the bag is at a higher risk of losing contact with the bottom retention arm of the clamp and falling to the ground. In a certain embodiment, the secondary locking mechanism is simply two structural elements that come in contact at a predetermined degree of rotation toward the fully open position. Similar to FIG. 20, such an embodiment may include access 225 on first half 213 capable of receiving a pin. The pin has a length such that the pin encounters a structural element attached to second half 215, such as flexible coupling 217, to prevent further rotation of the two halves with respect to one another. One of the structural elements may have a first biased position and a second urged position such that in the biased position, the two structural elements will contact each other at the predetermined degree of rotation toward the fully open position. When the one structural element is in the urged position, the two structural elements are not capable of contacting each other and the arms may rotate to the fully open position. The secondary locking mechanism may be achieved through any combination of structural components known to a person having ordinary skill in the art.

In an embodiment, the bag clamp includes a mechanical lock that must be released before the release button can be actuated. The mechanical lock may include a removable feature preventing the actuation of the release button until the removable feature is replaced or the mechanical lock may require that the removable feature be removed to release the button. The mechanical lock and removable feature, such as a lock and key, respectively, may be any lock and any feature that is known to a person having ordinary skill in the art.

In an embodiment, the bag clamp includes a spring mechanism creating an opening force on the two arms. This allows the mechanism to go, unaided to the open position upon the actuation of the release button.

In an embodiment, the bag clamp may be any size and shape known to a person having ordinary skill in the art such that there are at least two retention arms capable of alternating between an open and closed position and such that there exists an open receiving space between retention arms while in the closed position. Additionally, the bag clamp may be used for any function known to a person having ordinary skill in the art, such as a temporarily clamping two objects together.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:
1. A bag clamp comprising:
a first retention arm and a second retention arm, wherein each retention arm has a first end and a second end creating a length, with the first ends connected to a mechanism housing;
the first retention arm and second retention arm having a shape such that the two retention arms have an open receiving space located between the first and second ends of the retention arms;
a pivoting axis, in close proximity to the first end of the retention arms, about which the retention arms rotate such that the retention arms have an open position and a closed position, wherein in the closed position the second ends of the retention arms are in close proximity and in the open position the second ends of the retention arms are separated by a distance that is greater than the distance between the second ends of the retention arms in the closed position;
the mechanism housing containing a locking mechanism having an engaged setting and a disengaged setting, wherein in the engaged setting, the locking mechanism prevents the retention arms from rotating toward the open position and in the disengaged setting, the locking mechanism allows the retention arms to rotate toward the open position;
a release button having a first position and a second position and in communication with the locking mechanism, wherein in the first position, the release button places the locking mechanism in the engaged setting and in the second position, the release button places the locking mechanism in the disengaged setting;
a biasing component in communication with the release button such that transitioning between button positions requires overcoming a biasing force imposed on the release button by the biasing component;
the locking mechanism further including a jamming component and a jamming spring, wherein the jamming spring forces a contacting surface of the jamming component into contact with an internal surface of the mechanism housing to prevent rotation of the retention arms toward the open position; and
the release button configured to force the contacting surface of the jamming component out of contact with the internal surface of the mechanism housing when the release button is urged to the second position, thereby allowing the retention arms to rotate toward the open position.

2. The bag clamp of claim 1, further comprising:
the release button having a conical member extending from a bottom surface facing the jamming component;
the jamming component having a frustoconical aperture sized to receive at least a portion of the conical member on the release button; and
the conical member and the frustoconical aperture misaligned when the jamming component is in the engaged setting with the conical member at least partially received by the frustoconical aperture.

3. The bag clamp of claim 1, further comprising:
the mechanism housing comprising of a first section and a second section, the first section in communication with the first retention arm and the second section in communication with the second retention arm;
the second section housing the jamming component;
the first section having a cylindrical extension extending into the second section, wherein the cylindrical extension has an inner surface that encircles at least some portion of the jamming component; and the engaged setting including the contacting surface of the jamming component in contact with the inner surface of the cylindrical extension.

4. The bag clamp of claim 3, further comprising the contacting surface of the jamming component having a curved shape with the curvature terminating at a jamming corner, thereby allowing rotation of the cylindrical extension along the curved contacting surface towards the jamming corner because of a limited frictional force, while preventing rotation in the opposite direction because of the increased friction between the jamming corner and the inner surface of the cylindrical extension.

5. The bag clamp of claim 4, further including:

the jamming component further having a pivoting axis and a jamming pin for restricting rotation about the pivoting axis;

whereby the pivoting axis allows the jamming component to rotate the jamming corner into a desired position that causes an increase in friction between the jamming corner and the inner surface of the cylindrical extension, while the jamming pin prevents the jamming corner from rotating past the desired position.

6. The bag clamp of claim 1, further comprising a compression pad disposed on the second end of each retention arm, whereby the compression pads allow the retention arms to rotate past an initial point of contact between the compression pads and a surface on which the bag clamp is being clamped such that the locking arms become engaged in a more closed position than the initial point of contact.

7. The bag clamp of claim 1, further comprising a wireless communication module capable of communicating with a mobile device.

8. The bag clamp of claim 1, further comprising a visual alert.

9. The bag clamp of claim 1, further comprising an audible alert.

10. The bag clamp of claim 1, wherein the connection between the contacting surface and the first retention arm is a pivoting connection.

11. The bag clamp of claim 1, further comprising an alternate orientation attachment having an open receiving space that is generally perpendicular to the open receiving space of the bag clamp.

12. The bag clamp of claim 1, further comprising a strap retention feature originating near one end of one of the retention arms within the outer perimeter of the arms creating a gap, of a predetermined distance between the one retention arm and the strap retention feature that is adapted to receive a bag's straps.

13. The bag clamp of claim 1, further comprising a secondary locking mechanism having an engaged setting at a predetermined amount of rotation about the pivoting axis, which prevents the arms from rotating an amount greater than the predetermined amount of rotation.

14. The bag clamp of claim 1, further comprising a mechanical lock having a locked position and an unlocked position, wherein the locked position prevents the locking mechanism from moving to the disengaged setting.

* * * * *